(12) United States Patent
Sutter et al.

(10) Patent No.: US 8,128,748 B2
(45) Date of Patent: Mar. 6, 2012

(54) AQUEOUS TWO-COMPONENT ORGANOALKOXYSILANE COMPOSITION

(75) Inventors: Jolanda Sutter, Oberwil (CH); Wolf-Rüdiger Huck, Zürich (CH)

(73) Assignee: Sika Technology AG, Baar (CH)

( * ) Notice: Subject to any disclaimer, the term of this patent is extended or adjusted under 35 U.S.C. 154(b) by 151 days.

(21) Appl. No.: 12/230,063

(22) Filed: Aug. 22, 2008

(65) Prior Publication Data

US 2008/0314518 A1 Dec. 25, 2008

Related U.S. Application Data

(63) Continuation of application No. 11/513,172, filed on Aug. 31, 2006, now abandoned.

(30) Foreign Application Priority Data

Sep. 2, 2005 (EP) .................................. 05108072

(51) Int. Cl.
*C09D 5/08* (2006.01)
(52) U.S. Cl. .............. 106/287.11; 106/287.14; 524/838; 438/447; 427/387

(58) Field of Classification Search ............. 106/287.11; 524/838; 428/447; 427/387
See application file for complete search history.

(56) References Cited

U.S. PATENT DOCUMENTS 3,684,136 A 8/1972 Baumann
4,374,879 A * 2/1983 Roberts et al. ............... 428/34.7
(Continued)

FOREIGN PATENT DOCUMENTS

DE 41 19 484 12/1992
(Continued)

*Primary Examiner* — Margaret Moore
(74) *Attorney, Agent, or Firm* — Buchanan Ingersoll & Rooney PC

(57) ABSTRACT

The present invention relates to aqueous two-component adhesion promoter compositions and also to their use in methods of adhesive bonding or sealing. Additionally it relates to packaging consisting of the two-component composition and also a pack having two chambers. The two-component adhesion promoter composition is composed of a first component K1 comprising at least one organoalkoxysilane S and at least one anhydrous surfactant T; and of a second component K2 comprising at least water and at least one acid, the acid being present in an amount such that, after components K1 and K2 have been mixed, the resulting mixture is acidic.

31 Claims, 7 Drawing Sheets

U.S. PATENT DOCUMENTS

| | | | |
|---|---|---|---|
| 5,336,748 A * | 8/1994 | Castellucci | 528/38 |
| 5,363,994 A * | 11/1994 | Angeline | 222/529 |
| 5,728,203 A * | 3/1998 | Vorse et al. | 106/287.11 |
| 5,998,541 A | 12/1999 | Ogawa | |
| 6,294,620 B1 | 9/2001 | Huang et al. | |
| 6,379,448 B1 * | 4/2002 | Sirejacob | 106/287.12 |
| 6,511,752 B1 | 1/2003 | Yao et al. | |
| 6,564,935 B1 * | 5/2003 | Yamamoto et al. | 206/223 |
| 6,887,308 B2 * | 5/2005 | Zhang | 106/287.1 |
| 2003/0004295 A1 | 1/2003 | Fukasawa et al. | |

FOREIGN PATENT DOCUMENTS

| | | |
|---|---|---|
| WO | WO 93/08198 | 4/1993 |
| WO | WO 95/27558 | 10/1995 |

\* cited by examiner

Figure 1
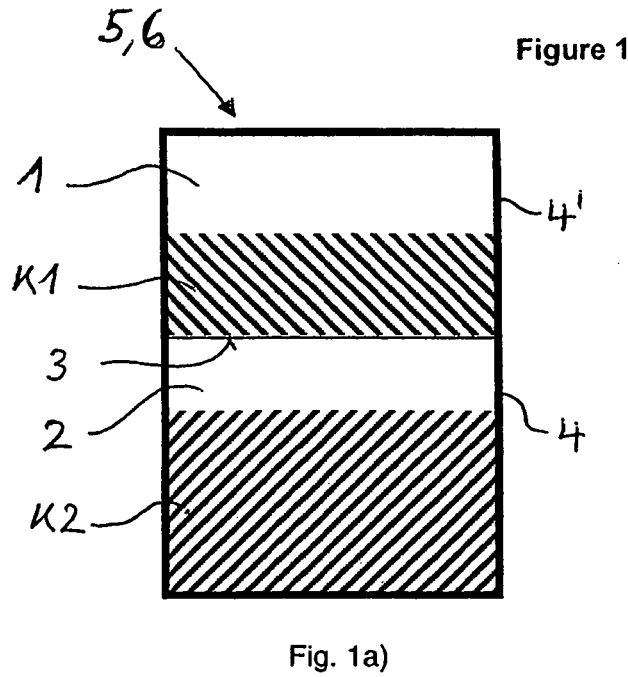
Fig. 1a)
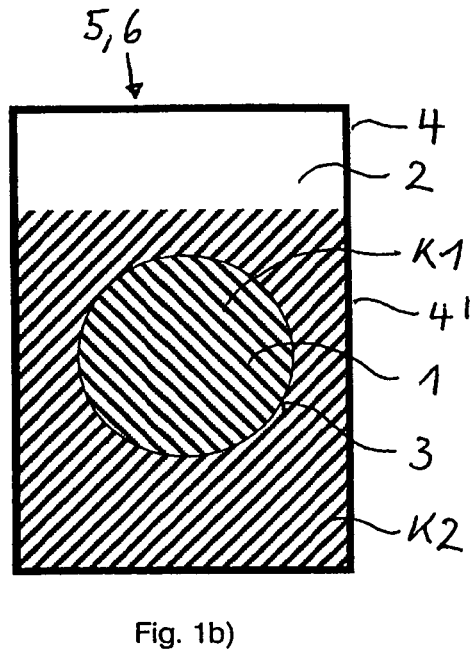
Fig. 1b)
Figure 2
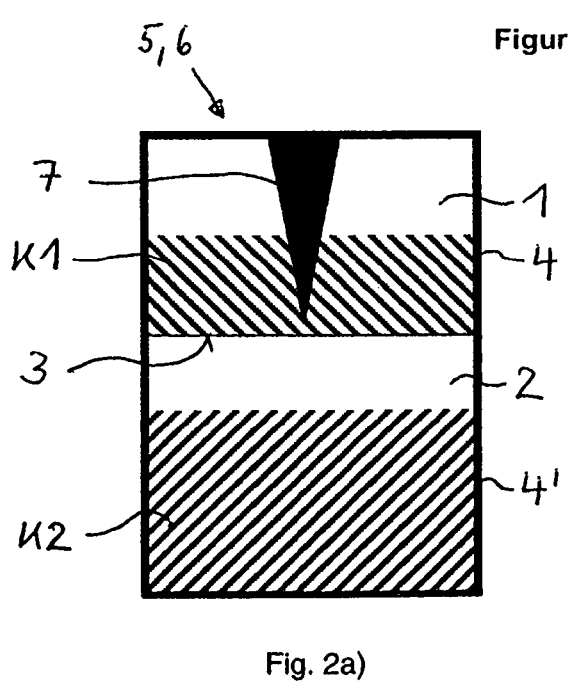
Fig. 2a)
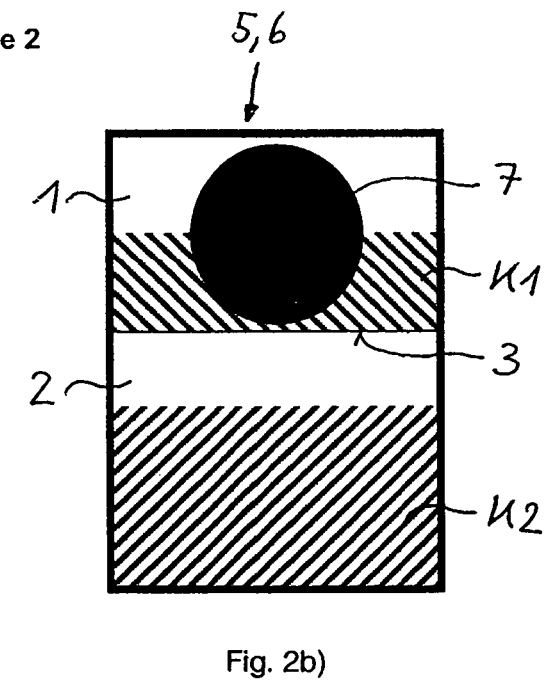
Fig. 2b)

Figure 3
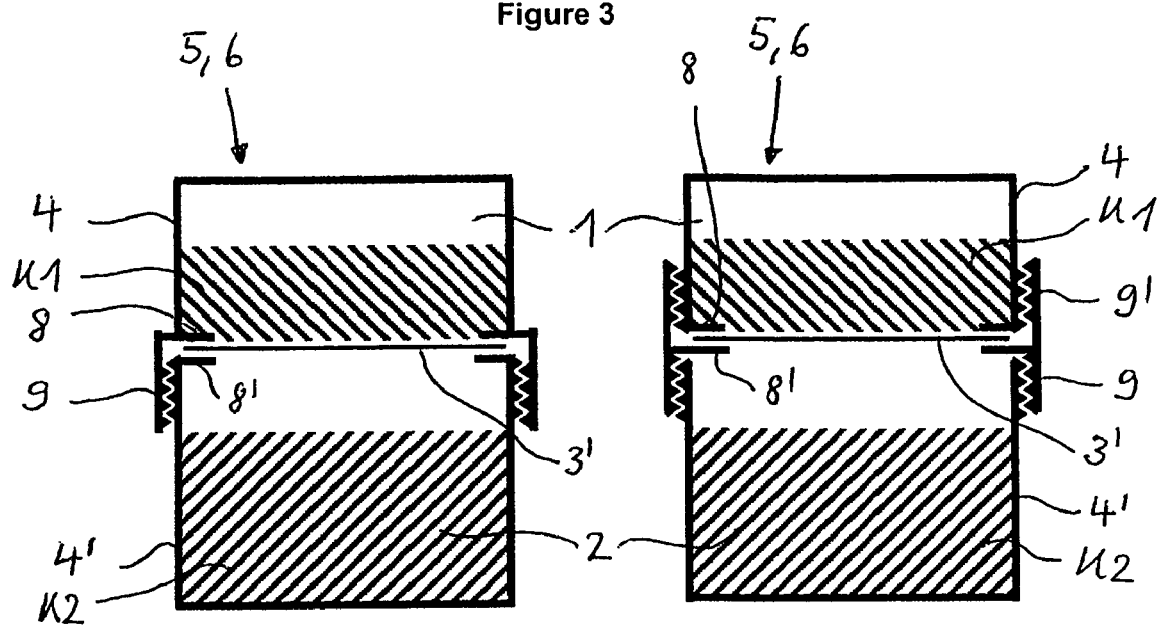
Fig. 3a)      Fig. 3b)
Figure 4
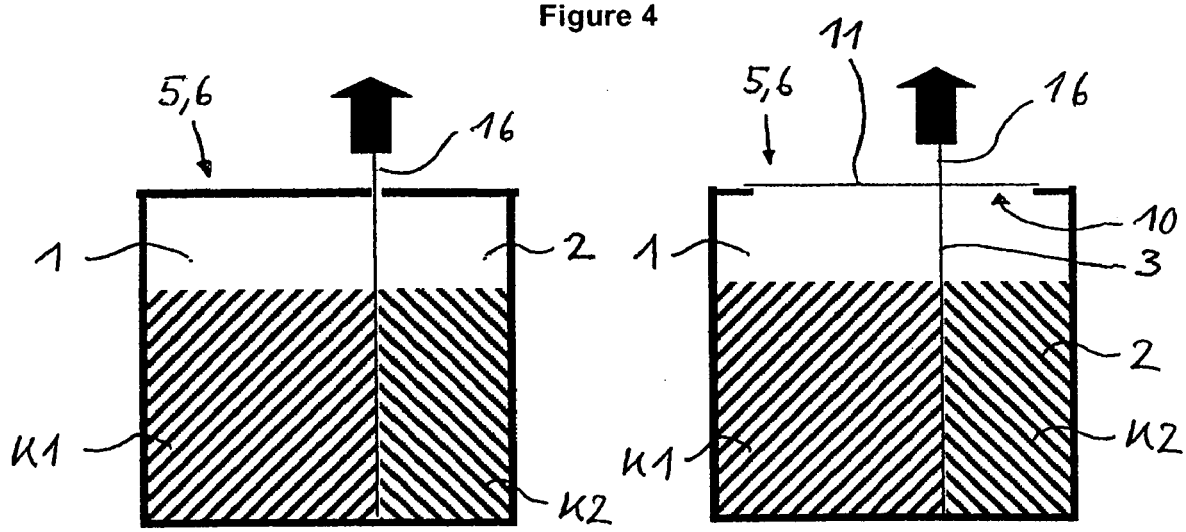
Fig. 4a)      Fig. 4b)

Figure 7
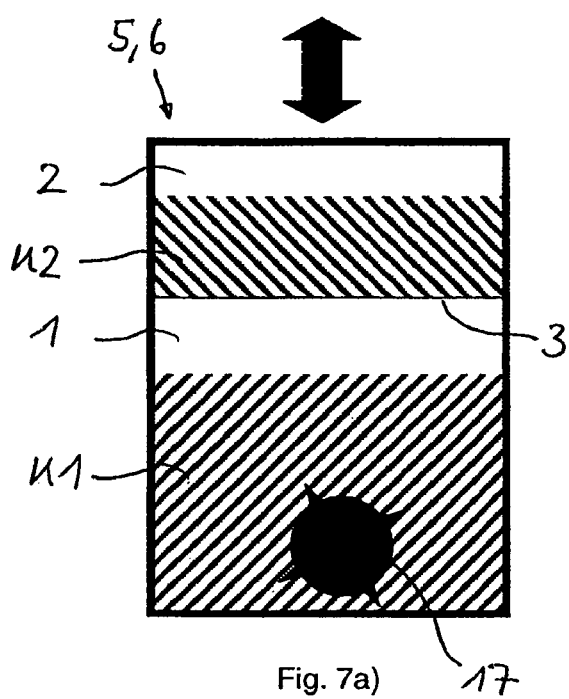
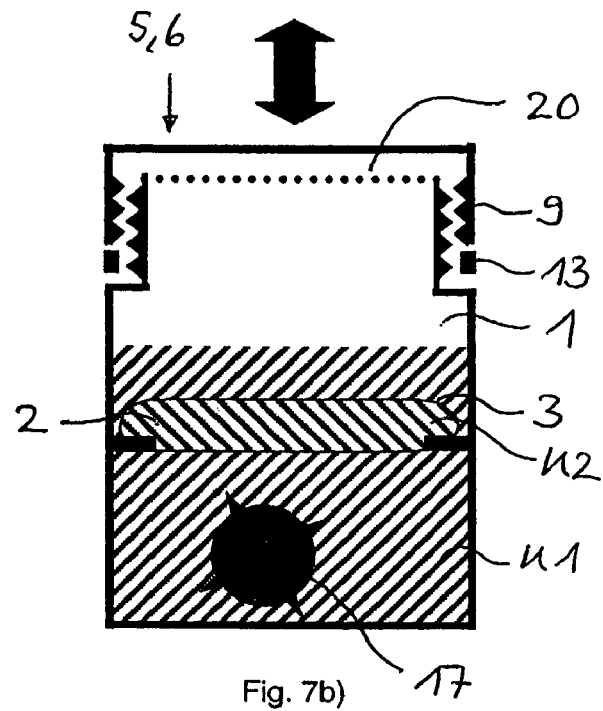
Fig. 7a)          Fig. 7b)
Figure 8
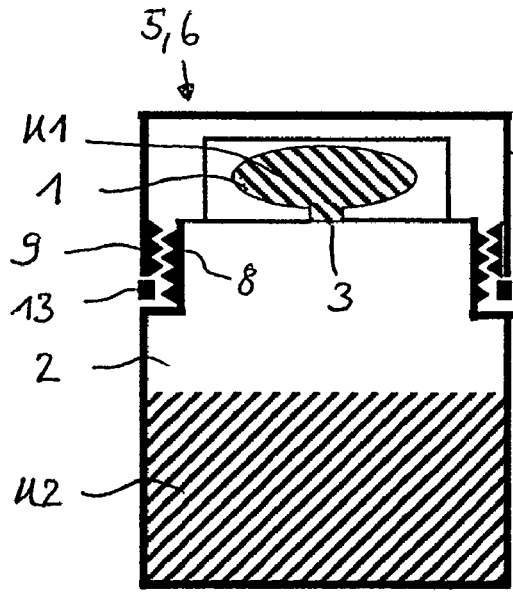
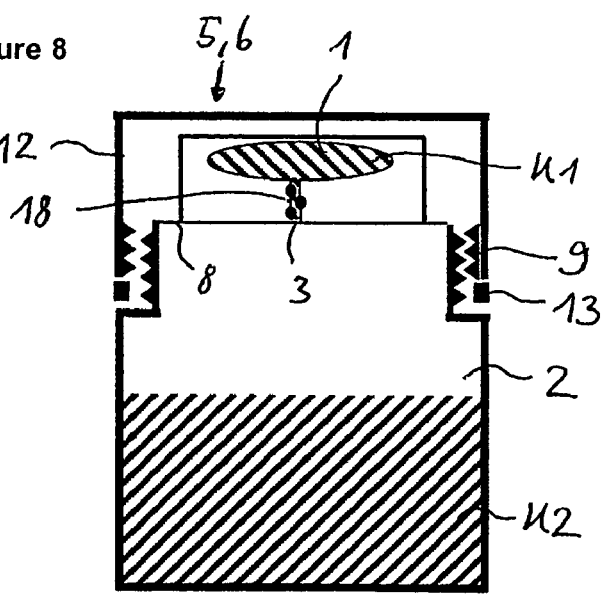
Fig. 8a)          Fig. 8b)

Figure 9
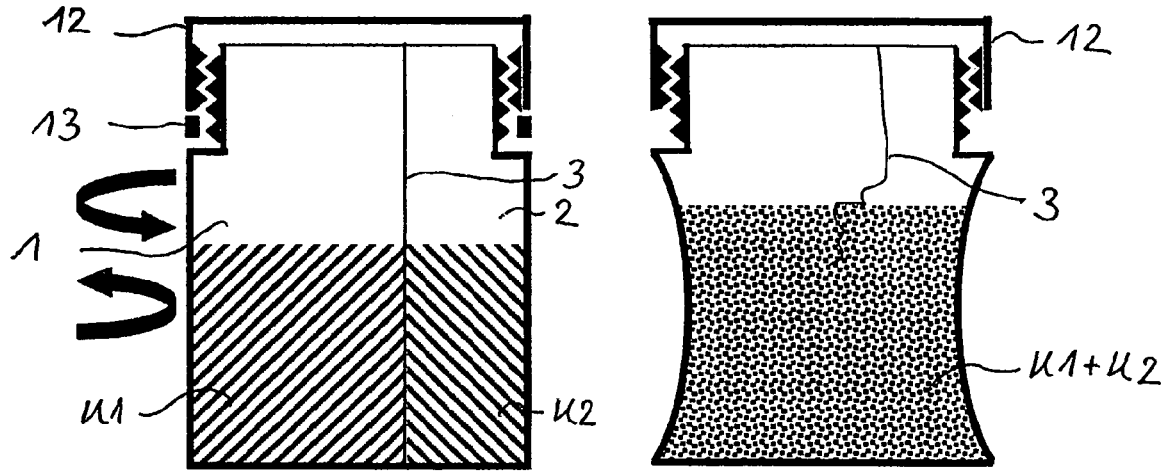
Fig. 9　　　　　Fig. 9'
Figure 10
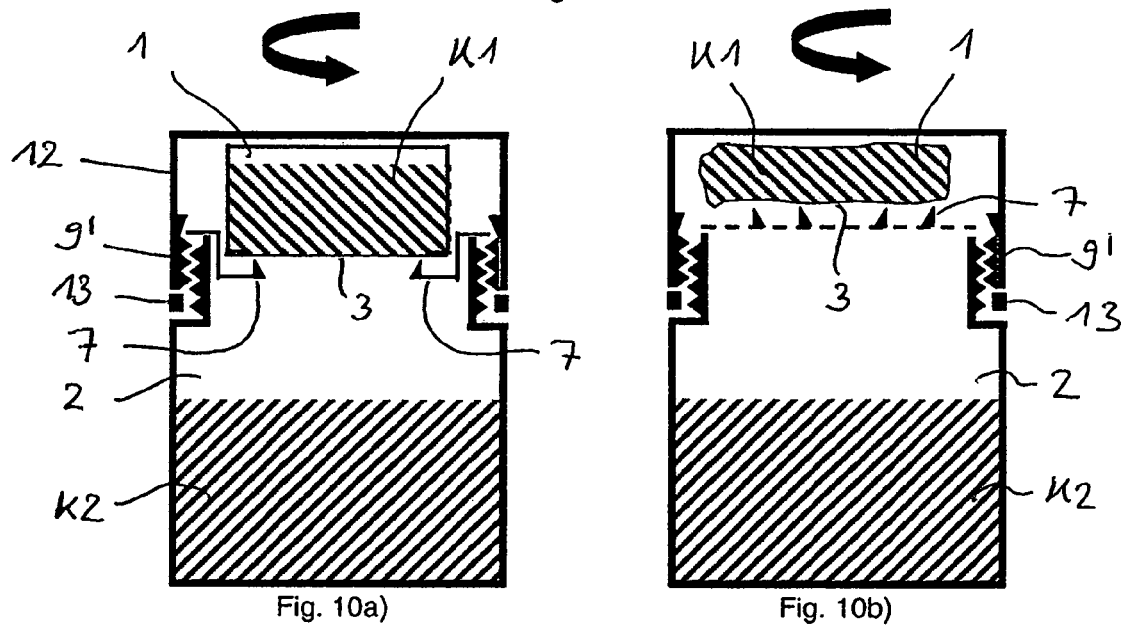
Fig. 10a)　　　　　Fig. 10b)

Fig. 10e')

Figure 10 (continued)
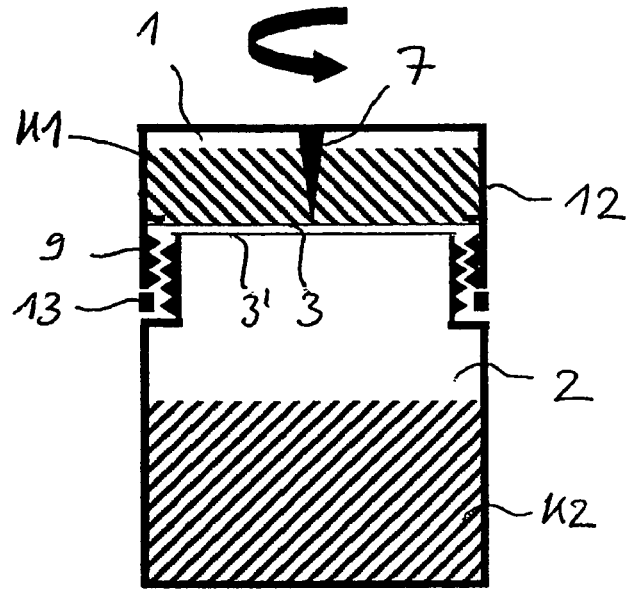
Fig. 10f)
Figure 11
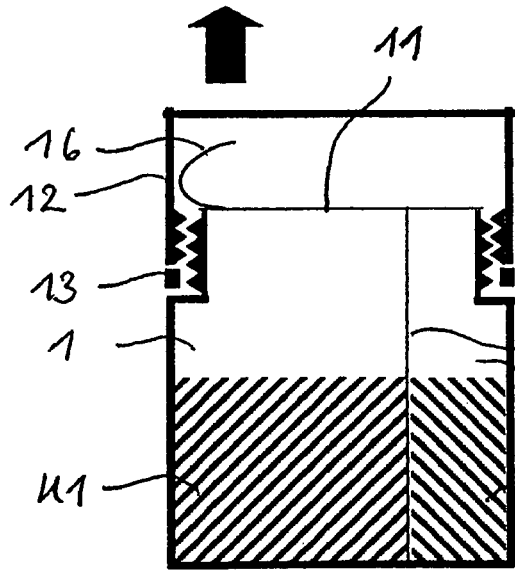 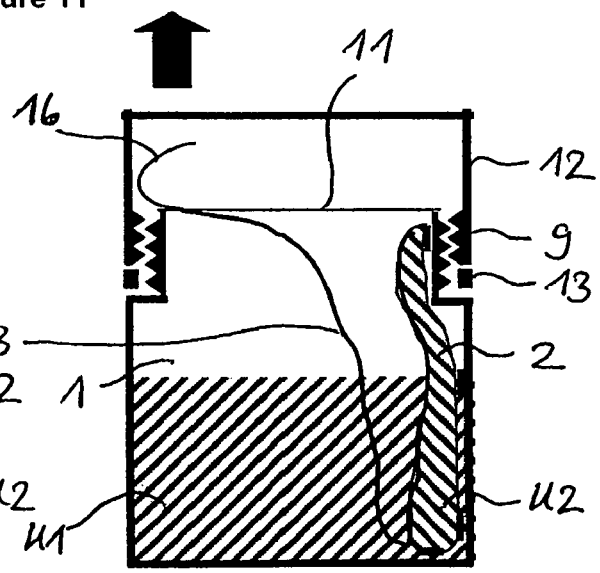
Fig. 11a)          Fig. 11b)

AQUEOUS TWO-COMPONENT ORGANOALKOXYSILANE COMPOSITION

This application is a continuation of U.S. application Ser. No. 11/513,172, filed on Aug. 31, 2006 now abandoned. This application claims the priority of European Application No. 05108072.9, filed on Sep. 2, 2005, the disclosure of which is incorporated herein by reference in its entirety.

TECHNICAL FIELD

The present invention pertains to the field of aqueous two-component organoalkoxysilane compositions and in particular to the field of aqueous adhesion promoters for improving the adhesion of adhesives and sealants.

PRIOR ART

It is known for adhesives and sealants that the adhesion for certain substrates is difficult to achieve. Such substrates must therefore be subjected to pre-treatment. One method frequently used is that of pre-treatment using primers or adhesion promoter compositions. The use of organoalkoxysilanes, often called just silanes, for this purpose has been known for a long time. Primers or tie coats of this kind, however, typically contain large amounts of solvent. For environmental and workplace safety reasons, solvent-based pre-treatment agents of this kind are increasingly losing their desirability. Attempts have therefore been made to prepare aqueous organoalkoxysilane compositions as primers or adhesion promoter compositions.

Organoalkoxysilanes, especially hydrophobic organoalkoxysilanes, are difficult to mix with water. In numerous instances there are two phases formed, with turbidities and flocs apparent at their interface. For a practical adhesion promoter, however, it is necessary for the adhesion promoter to be homogeneous.

It is in the nature of organoalkoxysilanes, however, to react with water. The alkoxysilane groups undergo hydrolysis with water to form silanols (Si—OH groups). Silanols can then undergo condensation to siloxanes (Si—O—Si groups). Such siloxanes, however, are usually no longer soluble, and undergo precipitation, leading to unwanted turbidities and precipitates. The storage life of aqueous organoalkoxysilane compositions is therefore very short.

U.S. Pat. No. 6,511,752 B2 discloses an aqueous primer which has been prepared from an aminotitanate, epoxysilane, and water and which possesses a long shelf life.

U.S. Pat. No. 6,294,620 B1 shows an aqueous emulsion primer which is prepared at a neutral pH in a two-step process in a high-speed mixer from water-insoluble ethoxysilanes in the presence of an emulsifier.

With regard to the preparation of these aqueous primers, however, there are narrow limits in respect of the organoalkoxysilane compositions, and/or they are very complicated to prepare.

SUMMARY OF THE INVENTION

It is an object of the present invention, therefore, to provide an aqueous adhesion promoter composition which has broad usefulness and can be prepared by a simple method.

Surprisingly it has been found that a two-component adhesion promoter composition according to claim 1 solves this problem.

The two components K1 and K2 in unmixed form are extremely stable on storage. Component K1 is much less sensitive to moisture than are typical organoalkoxysilane compositions, and so is well able to tolerate small amounts of moisture, of the kind which may come about, for example, as a result of poorly sealed containers or through the use of containers made from plastics which are known to be pervious to water diffusion.

The ready-to-use adhesion promoter composition is produced by simple shaking of the two components. Accordingly, the two-component adhesion promoter composition constitutes a pre-treatment system which is reliable in service, is easy to employ, and can be prepared and used even by untrained users. A consequent possibility are packaging forms consisting of a two-component pack having two chambers separated from one another by at least one dividing wall, into which the two components of the aqueous adhesion promoter composition have been packed, such packaging forms representing, also to the non-expert, a simple and reliable system of application.

It has been found, moreover, that, even after it has been mixed, the adhesion promoter composition can be used for a relatively long time, typically up to several weeks, without problems occurring with the adhesion.

BRIEF DESCRIPTION OF THE DRAWINGS

Exemplary embodiments of the invention are illustrated in more detail below with reference to the drawings. Across the various figures, elements that are alike are provided with the same reference symbols. The direction of forces is indicated by arrows.

FIG. 1 shows a cross section through an embodiment P1 having a rupturable dividing wall, FIG. 2 shows a cross section through an embodiment P2 having a bursting assistant, in particular having a cutting means, FIG. 3 shows a cross section through an embodiment P3 having a seal, FIG. 4 shows a cross section through an embodiment P4 having an extractable dividing wall, FIGS. 5-9 show a cross section through preferred embodiments of P1

FIG. 11 shows a cross section through preferred embodiments of P4

Figure 5:
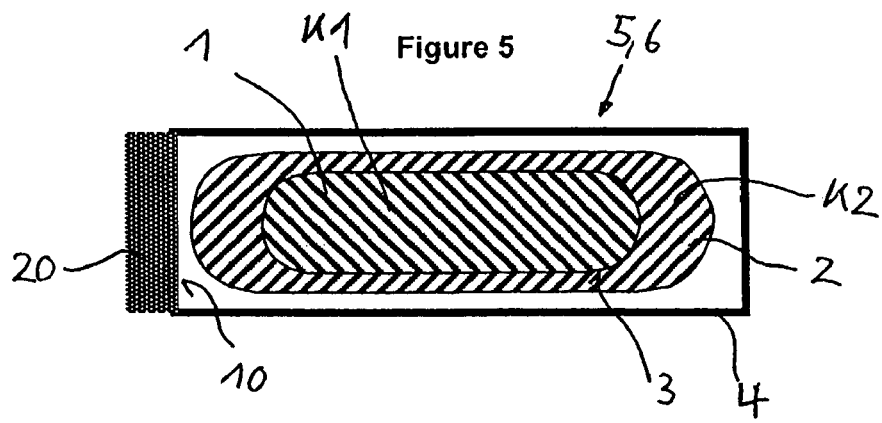

Only the elements important for the direct understanding of the invention have been shown. Movements and pressures are indicated by arrows.

Ways of Performing the Invention

The present invention relates to an aqueous two-component adhesion promoter composition composed of a first component K1 and of a second component K2. The first component K1 in this composition comprises at least one organoalkoxysilane S and at least one anhydrous surfactant T. The second component K2 comprises at least water and at least one acid. It is essential that the amount of acid be selected such that, after the two components K1 and K2 have been mixed, the resulting mixture is acidic. This means that the pH of such a mixture is less than 7. The preferred pH of such a mixture is between 3 and 5, in particular between 3.5 to 4.5.

The term "anhydrous" in the present document should not be interpreted to mean "absolutely free of water". Consequently, compounds and compositions are referred to as "anhydrous" even if they include slight traces of water, i.e. if they include a residual water content of not more than 1% by weight, in particular of not more than 0.5% by weight.

The term "organoalkoxysilane" or "silane" for short refers in the present document to compounds in which on the one hand there is at least one, usually two or three, alkoxy groups attached directly to the silicon atom (via an Si—O bond) and which, on the other hand, have at least one organic radical attached directly to the silicon atom (via an Si—C bond) and which do not have Si—O—Si bonds. Correspondingly, the term "silane group" identifies the silicon-containing group that is attached to the organic radical of the organoalkoxysilane. The organoalkoxysilanes, respectively their silane groups, have the capacity to undergo hydrolysis on contact with moisture. This hydrolysis forms organosilanols, which are organosilicon compounds containing one or more silanol groups (Si—OH groups) and, as a result of subsequent condensation reactions, organosiloxanes are formed, which are organosilicon compounds containing one or more siloxane groups (Si—O—Si groups).

Terms such as "aminosilane", "epoxysilane", "alkylsilane", "(meth)acrylatosilane" and "mercaptosilane" refer to silanes which contain the corresponding functional group, in this case, in other words, an aminoalkylalkoxysilane, epoxyalkylalkoxy-silane, alkylalkoxysilane, (meth)acrylatoalkoxysilane and mercaptoalkylalkoxysilane.

Organoalkoxysilanes S are, in particular, aminosilanes, epoxysilanes, mercaptosilanes, (meth)acrylatosilanes and alkylsilanes.

Aminosilanes are, in particular, aminosilanes of the formula (I) or the reaction products of the formula (I) containing at least one secondary or primary amino group with a compound (ARV) which contains at least one functional group that is able to react with a primary or secondary amino group.

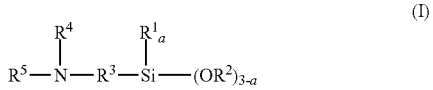
(I)

In this formula $R^1$ is an alkyl group having 1 to 8 C atoms, preferably a methyl group or an ethyl group. $R^1$ is preferably a methyl group.

Additionally, $R^2$ is an alkyl group having 1 to 5 C atoms, preferably a methyl group or an ethyl group or an isopropyl group. $R^2$ is preferably a methyl group or an ethyl group.

Additionally, $R^3$ is a linear or branched alkylene group having 1 to 4 C atoms. $R^3$ is preferably a propylene group.

Additionally, $R^4$ is H or a linear or branched alkylene group having 1 to 10 C atoms or is a substituent of the formula (II)

(II)

Additionally, $R^5$ is H or a linear or branched alkylene group having 1 to 10 C atoms- or a linear or branched alkylene group having 1 to 10 C atoms with further heteroatoms, or is a substituent of the formula (II)

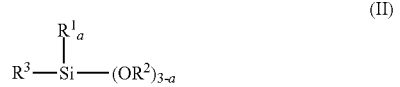
(II)

A particularly advantageous radical of a linear alkylene group having 1 to 10 C atoms with further heteroatoms, $R^5$, is the radical $CH_2CH_2NH_2$.

Finally, the index a is a value 0, 1 or 2, in particular 0 or 1. Preferably a is 0.

Examples of aminosilanes of this kind of the formula (I) are 3-aminopropyltrimethoxysilane, 3-aminopropyldimethoxymethylsilane, 3-amino-2-methylpropyltrimethoxysilane, 4-aminobutyltrimethoxysilane, 4-amino-butyldimethoxymethylsilane, 4-amino-3-methylbutyltrimethoxysilane, 4-amino-3,3-dimethylbutyltrimethoxysilane, 4-amino-3,3-dimethylbutyldimethoxymethylsilane, 2-aminoethyltrimethoxysilane, 2-aminoethyldimethoxymethylsilane, aminomethyltrimethoxysilane, aminomethyldimethoxymethylsilane, aminomethylmethoxydimethylsilane, N-methyl-3-aminopropyltrimethoxysilane, N-ethyl-3-aminopropyltrimethoxysilane, N-butyl-3-aminopropyltrimethoxysilane, N-cyclohexyl-3-aminopropyltrimethoxysilane, N-phenyl-3-aminopropyltrimethoxysilane, N-methyl-3-amino-2-methylpropyltrimethoxysilane, N-ethyl-3-amino-2-methylpropyltrimethoxysilane, N-ethyl-3-aminopropyldimethoxymethylsilane, N-phenyl-4-aminobutyltrimethoxysilane, N-phenylaminomethyldimethoxymethylsilane, N-cyclohexylaminomethyldimethoxymethylsilane, N-methylaminomethyldimethoxymethylsilane, N-ethylaminomethyldimethoxymethylsilane, N-propylamino-methyldimethoxymethylsilane, N-butylaminomethyldimethoxymethylsilane, N-(2-aminoethyl)-3-aminopropyl-trimethoxysilane, bis(trimethoxysilylpropyl)amine, tris(trimethoxysilylpropyl)amine, and also their analogues with ethoxy or isopropoxy groups instead of the methoxy groups on the silicon.

Preferred aminosilanes of the formula (I) are aminosilanes which are selected from the group comprising aminosilanes of the formula (III), (IV) and (V).

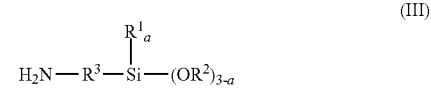
(III)

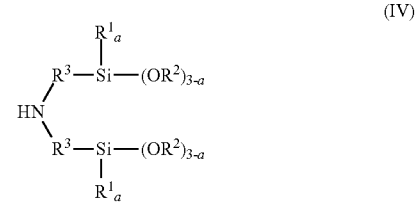
(IV)

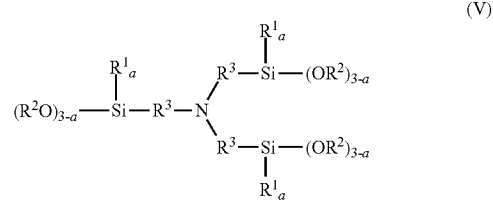
(V)

The most preferred aminosilanes of the formula (I) are the aminosilanes 3-aminopropyltrimethoxysilane, N-(2-aminoethyl)-3-aminopropyltrimethoxysilane, 3-[2-(2-aminoethylamino)ethylamino]propyltrimethoxysilane, bis(trimethoxysilylpropyl)amine and tris(trimethoxy-silylpropyl)amine.

In one embodiment the aminosilane is a reaction product of an aminosilane of the formula (I) as has been described above, having at least one secondary or primary amino group, with a compound (ARV) which contains at least one functional group which is able to react with a primary or secondary amino group.

This functional group able to react with a primary or secondary amino group is preferably an epoxy group. Other groups, however, are also conceivable, such as isocyanate groups or activated double bonds, for example. Particularly suitable compounds with epoxy groups are epoxysilanes. Preferred compounds (ARV) which can react with the aminosilane of the formula (I) having at least one secondary or primary amino group are epoxysilanes of the formula (VI)

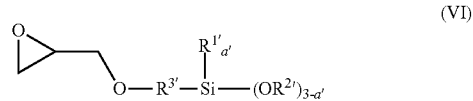
(VI)

$R^{1'}$ in this formula is an alkyl group having 1 to 8 C atoms, preferably a methyl group or an ethyl group. $R^{2'}$ is an alkyl group having 1 to 5 C atoms. Additionally, $R^{3'}$ is a linear or branched alkylene group having 1 to 4 C atoms, and a' is 0, 1 or 2, especially 0 or 1.

$R^{1'}$ is in particular a methyl group. $R^{2'}$ is preferably a methyl group or an ethyl group or an isopropyl group. With particular preference $R^{2'}$ is a methyl group or an ethyl group. $R^{3'}$ is preferably propylene. The index a' is preferably 0.

Examples of epoxysilanes are 2-(3,4-epoxycyclohexyl) ethyltrimethoxysilane, 2-(3,4-epoxycyclohexyl)-ethyltriethoxysilane, 3-glycidyloxypropyltriethoxysilane and 3-glycidyloxypropyltrimethoxysilane.

Preferred epoxysilanes are 3-glycidyloxypropyl-triethoxysilane and 3-glycidyloxypropyltrimethoxysilane. The most preferred epoxysilane is 3-glycidyloxypropyltrimethoxysilane.

The aminosilane of the formula (I) used for the reaction product comprises, in addition to N-(2-aminoethyl)-3-aminopropyltrimethoxysilane and N-(2-aminoethyl)-3-aminopropyltriethoxysilane, preferably N-(2-aminoethyl)-3-aminopropyltrimethoxysilane, in particular, aminosilanes of the formula (III) or (IV), especially 3-aminopropyltrimethoxysilane, bis(tri-methoxysilylpropyl)amine, 3-aminopropyltriethoxysilane and bis(triethoxysilylpropyl)amine. Preference is given to 3-aminopropyltrimethoxysilane and bis(trimethoxy-silylpropyl)amine.

In accordance with the stoichiometry of the aminosilane of the formula (I) and of the amine-reactive compound (ARV) it is possible for the reaction product still to have primary or secondary amino groups or not.

Examples of such reaction products are compounds of the formula (VII), (VIII), (IX), (X), (XI) and (XII).

The compounds of the formula (VII), (VIII) and (IX) are obtained from the reaction of N-(2-aminoethyl)-3-aminopropyltrimethoxysilane and 3-glycidyloxypropyl-trimethoxysilane.

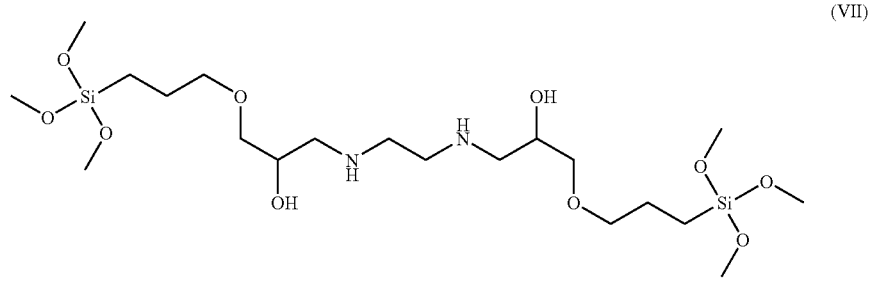

(VII)

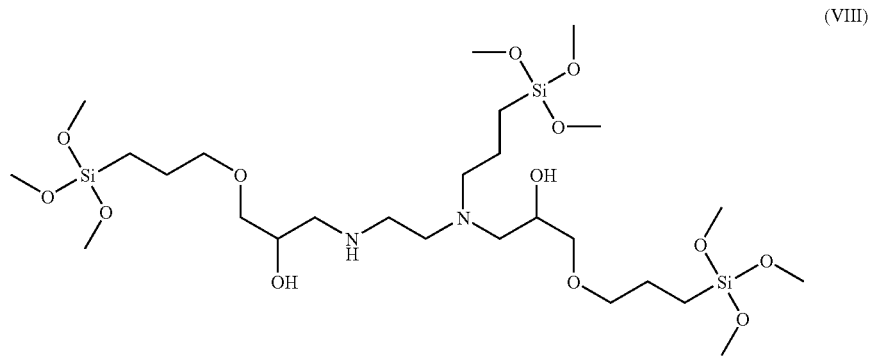

(VIII)

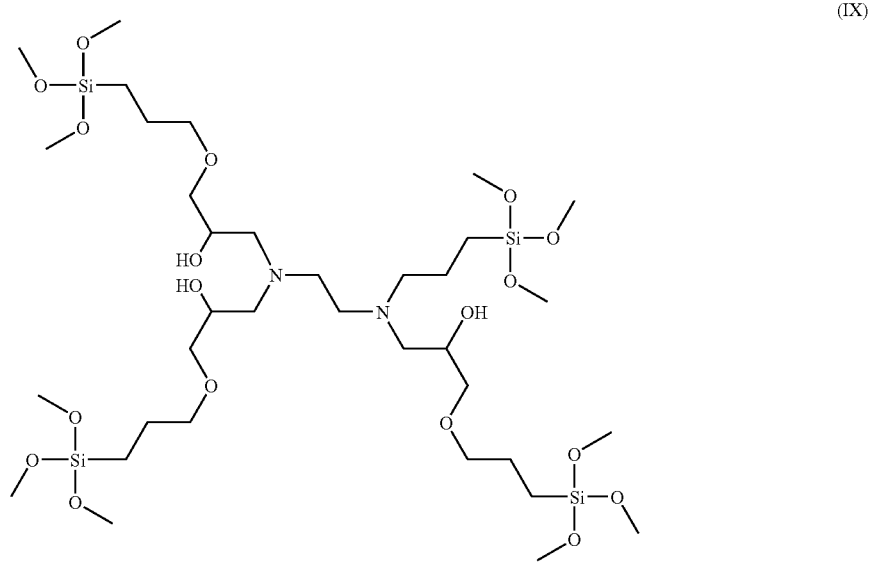

(IX)

The compounds of the formulae (X) and (XI) are obtained from the reaction of 3-aminopropyltrimethoxysilane and 3-glycidyloxypropyltrimethoxysilane.

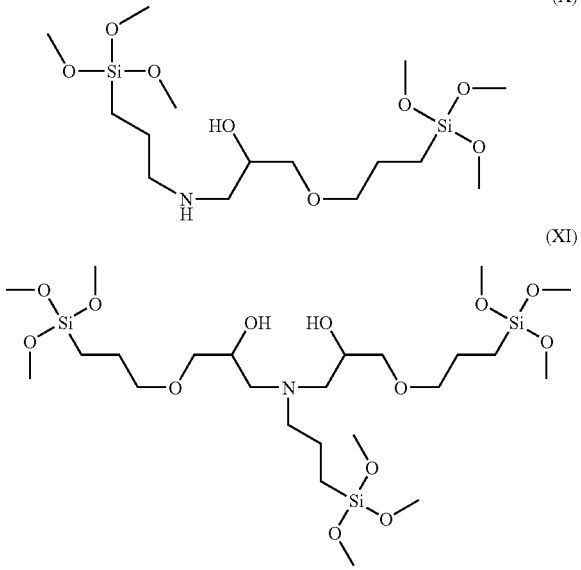

The compound of the formula (XII) is obtained from the reaction of bis(trimethoxysilylpropyl)amine and 3-glycidyloxypropyltrimethoxysilane.

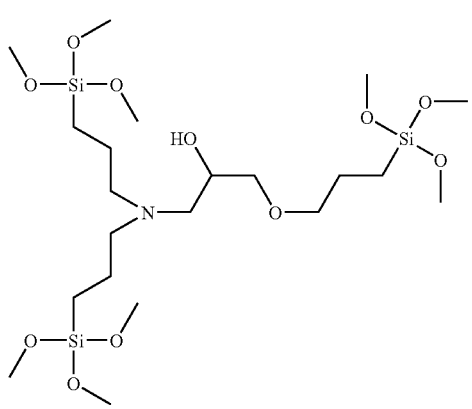

Examples of amine-reactive compounds (ARV) having activated double bonds are, for example, α,β-unsaturated compounds, especially maleic diesters, fumaric diesters, citraconic diesters, acrylic esters, methacrylic esters, cinnamic esters, itaconic diesters, vinylphosphonic diesters, vinylsulphonic aryl esters, vinyl sulphones, vinyl nitriles, 1-nitroethylenes or Knoevenagel condensation products such as those, for example, of malonic diesters and aldehydes such as formaldehyde, acetaldehyde or benzaldehyde. Amine-reactive compounds of this kind form Michael adducts for which the amine undergoes addition to the double bond. Examples of reaction products of this kind are Michael adducts of 3-aminopropyltrimethoxysilane, 3-aminopropyldimethoxymethylsilane, 4-amino-3,3-dimethyl-butyltrimethoxysilane, 4-amino-3,3-dimethylbutyl-dimethoxymethylsilane, aminomethyltrimethoxysilane or aminomethyldimethoxymethylsilane with dimethyl, diethyl or dibutyl maleate, tetrahydrofurfuryl, isobornyl, hexyl, lauryl, stearyl, 2-hydroxyethyl or 3-hydroxy-propyl acrylate, dimethyl, diethyl or dibutyl phosphonate, acrylonitrile, 2-pentenenitrile, fumaronitrile or β-nitrostyrene, and also the analogues of the aforementioned aminosilanes with ethoxy groups instead of the methoxy groups on the silicon. Mention should be made in particular of the Michael adduct diethyl N-(3-trimethoxysilylpropyl)aminosuccinate.

Examples of amine-reactive compounds (ARV) having isocyanate groups are isocyanatosilanes or polyisocyanates. Particular isocyanatosilanes are 3-isocyanatopropyltrimethoxysilane and 3-isocyanato-propyltriethoxysilane. Examples of polyisocyanates are tolylene 2,4- and 2,6-diisocyanate (TDI) and any desired mixtures of these isomers, diphenylmethane 4,4'-,2,4'- and 2,2'-diisocyanate (MDI) and any desired mixtures of these and further isomers, phenylene 1,3- and 1,4-diisocyanate, 2,3,5,6-tetramethyl-1,4-diisocyanatobenzene, hexamethylene 1,6-diisocyanate (HDI), 2-methylpentamethylene 1,5-diisocyanate, 2,2,4- and 2,4,4-trimethylhexamethylene 1,6-diisocyanate (TMDI), dodecamethylene 1,12-diisocyanate, cyclohexane 1,3- and 1,4-diisocyanate and any desired mixtures of these isomers, 1-isocyanato-3,3,5-trimethyl-5-isocyanatomethylcyclohexane (isophorone diisocyanate or IPDI), perhydrodiphenylmethane 2,4'- and 4,4'-diisocyanate (HMDI), 1,4-diisocyanato-2,2,6-trimethylcyclohexane (TMCDI), xylylene m- and p-diisocyanate (XDI), tetramethylxylylene 1,3- and 1,4-diisocyanate (TMXDI), 1,3- and 1,4-bis(isocyanatomethyl)cyclohexane, oligomers of the aforementioned polyisocyanates, and also any desired mixtures of the aforementioned polyisocyanates. Preference is given to MDI, TDI, HDI and IPDI, and also to their biurets or isocyanurates.

If the organoalkoxysilane S is an epoxysilane then the preferred epoxysilanes are those as described above as amine-reactive compounds (ARV).

Exemplary mercaptosilanes as organoalkoxysilane S are 3-mercaptopropyltrimethoxysilane and 3-mercaptopropyltriethoxysilane.

Exemplary (meth)acrylatosilanes as organoalkoxysilane S are 3-methacryloyloxypropyltrimethoxysilane and 3-methacryloyloxypropyltriethoxysilane.

If the organoalkoxysilane S is an alkylsilane, mention is to be made in particular of the silanes with $C_1$-$C_6$ alkyl radicals, such as, for example, methyltrimethoxysilane, ethyltrimethoxysilane and butyltrimethoxysilane.

As surfactants T it is possible to use natural or synthetic substances which in solutions lower the surface tension of the water or other liquids. As surfactants, also called wetting agents, it is possible to use anionic, cationic, nonionic or ampholytic surfactants or mixtures thereof.

Examples of anionic surfactants are surfactants containing carboxylate, sulphate, phosphate or sulphonate groups, such as, for example, amine acid derivatives, fatty alcohol ether sulphates, fatty alcohol sulphates, soaps, alkylphenol ethoxylates, fatty alcohol ethoxylates, and also alkanesulphonates, olefinsulphonates or alkyl phosphates.

The non-ionic surfactants include, for example, ethoxylates, such as ethoxylated adducts of alcohols, such as polyoxyalkylene polyols, amines, fatty acids, fatty acid amides, alkylphenols, ethanolamides, fatty amines, polysiloxanes or fatty acid esters, and also alkyl or alkylphenyl polyglycol ethers, such as fatty alcohol polyglycol ethers, or fatty acid amides, alkylglycosides, sugar esters, sorbitan esters, polysorbates or trialkylamine oxides, and also esters and amides of poly(meth)acrylic acids with polyalkylene glycols or aminopolyalkylene glycols, which may be capped with alkyl groups at no more than one end.

Examples of cationic surfactants are quaternary ammonium or phosphonium compounds, such as tetraalkylammonium salts, N,N-dialkylimidazoline compounds, dimethyldistearylammonium compounds, or N-alkylpyridine compounds, especially ammonium chlorides.

The ampholytic or amphoteric surfactants include amphoteric electrolytes, known as ampholytes, such as aminocarboxylic acids, for example, and betaines.

Surfactants of this kind are widely available commercially.

Particularly suitable are nonionic surfactants, especially alkoxylated alcohols. Compounds which have been found to be particularly suitable include alkoxylated nonionic fluorosurfactants, especially Zonyl® FSO-100, which is available commercially from ABCR, Germany, and alkoxylated alcohols or alkoxylated alkylphenols, especially Antarox FM 33, which is available commercially from Rhodia.

In order to ensure good stability of component K1 on storage it is necessary for the surfactant to be anhydrous, since the introduction of substantial amounts of water by the surfactant can lead to premature hydrolysis of the silanes and hence to storage problems. With regard to the understanding of the term "anhydrous", refer to the definition above.

In order to maximize the stability of component K1 on storage it is of advantage if the proportion of organoalkoxysilane S to surfactant T is maintained within a defined ratio. If the ratio S:T is greater than 5:1, the sensitivity to water is not substantially improved. If this ratio is less than 1:2, in particular less than 2:3, the adhesion of the aqueous adhesion promoter composition is influenced increasingly negatively.

In order to ensure effective and rapid mixing of components K1 and K2 it is also possible to use higher ratios of S:T than 5:1, in those cases in which an increase in the storage stability of component K1 is not needed or wanted. In that case ratios of organoalkoxysilane S to surfactant T (S:T) of between 20:1 to 1:2 are possible.

Preferably the ratio of organoalkoxysilane S to surfactant T (S:T) is between 5:1 and 1:2.

The optimum ratio of organoalkoxysilane S to surfactant T amounts, in particular for aminosilanes as organoalkoxysilane S, to a value of 3:1 to 2:3.

It is preferred for component K1 to contain not less than 33% by weight, in particular not less than 40% by weight, of organoalkoxysilane S.

Component K1 may comprise further constituents. Examples of such additions are solvents, inorganic fillers, catalysts and stabilizers, dyes or pigments.

If further constituents of this kind are used, it is preferred for component K1 not to contain more than 1% by weight, in particular not more than 0.5% by weight, of water.

Preference is given to components K1 which are composed essentially only of organoalkoxysilane S and surfactant T. By "essentially" is meant in this context that the weight total of organoalkoxysilane S and surfactant T is more than 90% by weight, in particular more than 95% by weight, preferably more than 99% by weight, based on the weight of component K1.

Since especially polar organoalkoxysilanes, in particular those which are water-soluble, are more sensitive to water in terms of stability on storage, the improvements which can be achieved by virtue of the present invention are manifested in particular with regard to polar, especially water-soluble, organoalkoxysilanes S. This is the reason why very apolar organoalkoxysilanes S, such as higher alkylalkoxysilanes, for example, such as dodecyltrimethoxysilane or octadecyltrimethoxysilane, are not preferred as organoalkoxysilanes S. The improvement in stability on storage with respect to water is particularly significant in the case of aminosilanes as organoalkoxysilanes S.

The components K1, particularly if they contain aminosilanes as organoalkoxysilanes S, are significantly less sensitive to the effect of water during the storage period. This is manifested in particular when water, especially in the form of atmospheric moisture, may come into contact with component K1. Reasons for such contact may be, for example, packs which are not impervious. Thus in practice it may well be the case that original packs, for example, are not impervious, or that a storage container is poorly or unimperviously resealed after having been opened for the first time, or that the said container is completely unsealed and exposed to the environment for a certain time. Finally, the storage stability of components K1 can be increased sharply if they are stored in vessels made of plastic. The plastics typically used for plastic containers, such as polyethylene or polypropylene, indeed, frequently exhibit an inadequate water vapour diffusion imperviousness. Silane compositions of the prior art are therefore stored not in plastic containers but instead in containers made of glass, metals or composites. Through the possibility of the use of plastic containers for storage of the components K1 presented here, there are therefore enormous cost advantages and weight advantages arising, and also additional freedoms in the design and form of the pack or packaging respectively.

The improved storage properties and/or reduced sensitivity to water during the storage time are apparent in particular through the absence, or at least severe retardation, of the formation of precipitations or turbidities or gels, without adverse affect on the adhesion promotion properties.

Component K2 contains besides water at least one acid. The acid may be organic or inorganic. Organic acids are firstly carboxylic acids, in particular a carboxylic acid selected from the group comprising formic, acetic, propionic, trifluoroacetic, oxalic, malonic, succinic, maleic, fumaric and citric acid and also amino acids, especially aspartic acid and glutamic acid. Preferred acids are those having a $pK_a$ of between 4.0 and 5. Acids of this kind, on account of their $pK_a$, possess an excellent buffer effect in the pH range of 3.5 to 4.5 that is optimum for the present invention and that results when components K1 and K2 are mixed. By $pK_a$ is meant by the chemist, as is known, the negative decadic logarithm of the acid dissociation constant $K_a$: $pK_a = -\log_{10} K_a$.

Acetic acid is a preferred carboxylic acid. organic acids are secondly, in particular, those acids which contain a sulphur atom or a phosphorus atom. Organic acids of this kind are, in particular, organic sulphonic acids. By organic sulphonic acids are meant compounds which contain an organic radical containing carbon atoms and also contain at least one functional group —$SO_3H$.

The aromatic sulphonic acid may be monocyclic or polycyclic and there may be one or more sulphonic acid groups present. Possible examples include 1- or 2-naphthalenesulphonic acid, 1,5-naphthalenedisulphonic acid, benzenesulphonic acid or alkylbenzenesulphonic acids.

Preferred aromatic acids are those which have the formula (XIII)

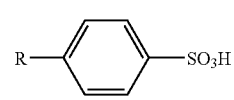

(XIII)

R in this formula is an alkyl radical having 1 to 18 atoms. Preferably R is a methyl or dodecyl group, in particular a dodecyl group.

The acid may also be an inorganic acid. Acids which have been found particularly suitable as inorganic acids are those which contain a sulphur atom or a phosphorus atom.

Acids containing phosphorus atoms are, in particular, phosphoric acid, phosphorous acid, phosphonic acid and phosphonous acid.

Acids containing sulphur atoms are, in particular, sulphur acids, especially sulphuric acid, sulphurous acids, persulphuric acid, disulphuric acid (pyrosulphuric acid), disulphurous acid, dithionic acid, dithionous acid, thiosulphuric acid or thiosulphurous acid.

It has been found that effective adhesion to paints, particularly to automotive topcoats, can be achieved if the acid contains at least one sulphur atom and has a $PK_a$ of less than 2.

Component K2 may comprise further constituents. Examples of such additions are solvents, inorganic fillers, catalysts and stabilizers, dyes or pigments.

The weight fraction of the water is preferably at least 60% by weight, based on the weight of component K2.

It is preferred for component K2 to be composed essentially of water and acid, in other words for the amount of water and acid together to be more than 90% by weight, in particular more than 95% by weight, preferably more than 99% by weight, based on the weight of component K2.

The amount of acid in the component is to be such that a mixture of components K1 and K2 is acidic and that its pH is preferably between 3 and 5, in particular between 3.5 to 4.5. This needs to be borne in mind if component K1 includes basic constituents, particularly if component K1 includes aminosilanes.

Apart from one another, components K1 and K2 can be stored for a very long time. For the application of the aqueous adhesion promoter compositions, components K1 and K2 are mixed. It is a substantial advantage of the present invention that this mixing is very easy to accomplish.

If component K1 is added to component K2, the two components mix spontaneously or after gentle stirring. This is in stark contrast to those cases, not in accordance with the invention, in which organoalkoxysilanes without surfactants are added to component K1. Because of the difference in density, in that case the majority of organoalkoxysilanes fall to the bottom, producing a two-phase system which can be homogenized only by means of intense high-speed mixing or dispersing. In many cases, moreover, in the course of addition or at the phase boundary, precipitations or turbidities are produced which lead to an inhomogeneous product and are unwanted.

A further observation which has been made is that, owing to the use of the surfactant as part of component K1, the amount of acid that need be used in order to achieve effective miscibility of the silane component with the water component is less. This results in a lower odour nuisance from the inherent odour of the carboxylic acid, as compared with the similar component without surfactant.

The mixing of the components allows the hydrolysis of the organoalkoxysilanes S. Application of the mixed components preferably takes place not immediately after mixing. It is of advantage to allow a short time to elapse, typically of between one and ten minutes, before the mixture is applied to a substrate surface.

The desire is for the hydrolysis of the organoalkoxysilanes S to take place as quickly as possible after mixing but for the condensation to siloxanes to be retarded as much as possible.

In order to achieve rapid hydrolysis of the organoalkoxysilanes S, methoxysilanes ($R^2$ or $R^2$=—$CH_3$) are preferred over ethoxysilanes ($R^2$ or $R^2$=—$CH_2CH_3$)

There are in principle the three different ways of achieving an adhesive bond or a seal.

In a first method, after components K1 and K2 of a two-component adhesion promoter composition have been mixed, the mixture thus obtained is applied to a substrate S1 to be bonded or sealed. Subsequently an adhesive or sealant is applied to the flashed-off aqueous adhesion promoter composition which is located on the substrate S1. Thereafter the adhesive or sealant is contacted with a second substrate S2.

In a second method, after components K1 and K2 of a two-component adhesion promoter composition have been mixed, the mixture thus obtained is applied to a substrate S1 to be bonded or sealed. Subsequently an adhesive or sealant is applied to the surface of a second substrate S2. Thereafter the adhesive or sealant is contacted with the flashed-off aqueous adhesion promoter composition which is located on the substrate S1.

In a third method, after components K1 and K2 of a two-component adhesion promoter composition have been mixed, the mixture thus obtained is applied to a substrate S1 to be bonded or sealed. After the two-component adhesion promoter composition has been flashed-off, the adhesive or sealant is applied between the surfaces of the substrates S1 and S2.

In all three of these methods the second substrate S2 may consist of the same material as or a different material from the substrate S1.

The flashing-off of the aqueous adhesion promoter composition applied to the substrate surface makes it possible on the one hand for a major part of the water present on the substrate surface to evaporate and on the other hand for the organoalkoxysilanes, or their silanols, to undergo crosslinking with one another and/or with the surface. The flash-off time is typically about 10 to 15 minutes.

The application of the mixed aqueous adhesion promoter composition is accomplished by spraying, spreading, rolling or dipping. Typically the mixed aqueous adhesion promoter composition is applied by brush, cloth or felt.

In order to achieve a bonded or sealed assembly, in all three of these methods, the last of the specified steps is followed by a step of curing of the adhesive or sealant.

A variety of adhesives or sealants can be used. Depending on the use and location of deployment of the bonded or sealed body, the adhesive or sealant may be epoxy resin-based, isocyanate-based, based on (meth)acrylates or on silane-terminated polymers (STPs), particularly silane-terminated polyurethanes or silicones. The adhesives or sealants in question may, for example, be room-temperature-curing adhesives or sealants, hotmelt adhesives, dispersion adhesives or sealants, or pressure-sensitive adhesives.

The adhesive or sealant may be one-component or multi-component. Preferably the adhesive or sealant is one-component.

With maximum preference the adhesive is a moisture-curing one-component polyurethane adhesive or sealant, in particular a moisture-curing one-component polyurethane adhesive of the kind available commercially, for example, as Sikaflex® from Sika Schweiz AG.

The bonded or sealed articles obtained in this way are of diverse nature. In particular they come from the field of industrial manufacture, and are preferably means of transport, especially cars. They may also be components for mounting. Mounting components of this kind are, in particular, prefabricated modular components which are used as modules on the production line and in particular are attached or installed by adhesive bonding. These prefabricated components for mounting are preferably employed in the construction of means of transport.

Examples of a mounting component of this kind are the driver's cab of vans or trucks or locomotives, or sliding roofs for cars.

Also possible, however, are applications in the construction of furniture, white goods, such as washing machines, architectural components such as facings, or lifts.

Components K1 and K2 may be stored in two spatially separate containers or are part of a packaging form.

A packaging form 6 of this kind is composed of a pack 5 which has two chambers 1, 2 separated from one another by at least one dividing wall 3, and an aqueous two-component adhesion promoter composition as described above, the first component K1 being present in the first chamber and the second component K2 being present in the second chamber 2.

The possible and preferred embodiments of the chambers and also of the dividing walls are described schematically below.

FIG. 1 shows an embodiment P1 of a packaging form 6, respectively a pack 5 that is used. In this embodiment the dividing wall 3 is manufactured from a fragile material. FIG. 1*a* shows a variant in which the first chamber 1 is not completely surrounded by the second chamber 2, while FIG. 1*b* describes a variant in which the first chamber 1 is completely surrounded by the second chamber 2. The dividing wall 3 between the two chambers ruptures on application of pressure, as a result of which the two components K1, K2 can come into contact with one another, mix and/or react. The pressure is typically generated externally by the action of force on the outer wall 4, 4' of the chambers. This action of force is preferably an impact action or bending of the pack. The material of the dividing wall 3 is typically produced from glass, aluminium, an aluminium alloy, from a thin plastic or a composite material. The dividing wall 3 must be manufactured in a thickness such that it does not rupture simply as a result of the unintended action of force, of the kind which typically occurs, for example, in the course of transport. The outer wall 4, 4' must be of a design such that it does not rupture or tear when the pressure that leads to the rupture of the dividing wall 3 is applied. The outer wall 4, 4' is manufactured either from a metal or from an elastic plastic.

FIG. 2 shows an embodiment P2 of a packaging form 6, respectively a pack 5 that is used, with bursting means, especially cutting means 7. In this embodiment the pressure is applied to the dividing wall 3 by means of a cutting means 7. Either the cutting means 7 is mobile and is pressed onto the stationary dividing wall 3, or else the cutting means 7 is fixed and the dividing wall 3 is pressed onto the cutting means 7. As a result of the pressure the wall 3 tears, so that the two components K1, K2 can come into contact with another and/or react with one another. In the storage state of the packaging form, the cutting means 7 is preferably at a certain distance from the dividing wall 3. Cutting means 7 and dividing wall 3 can be displaced onto one another. This is accomplished either by application of pressure and hence by a deformation of the outer wall 4, 4', or by means of a thread. The outer wall 4, 4' must be of such a design that it does not rupture or tear itself when the pressure that leads to the collapse of the dividing wall 3 by means of cutting means 7 is applied. The outer wall 4, 4' is manufactured either of a metal foil or of an elastic plastic. The nature of the cutting means may in principle take very different forms. Thus FIG. 2*a*) shows a sharp point as cutting means 7, whereas FIG. 2*b* shows a ball as a bursting assistant, in particular cutting means, 7. The cutting means 8 preferably has either points or edges. Such points or edges facilitate the severing of the dividing wall 3. Therefore an embodiment according to FIG. 2*a* is preferred.

FIG. 3 shows an embodiment P3 of a packaging form 6, respectively a pack 5 that is used. In this embodiment the dividing wall is realised by a seal 3'. In the unopened state of the pack 5, the seal 3' separates the two chambers 1, 2 from one another. This is achieved by virtue of the fact that, in the unopened state, the seal 3' is squeezed by at least two wall sections 8, 8' of the outer wall 4, 4'. At least one of the wall sections 8, 8' is designed so that it can be moved by external influence. Such mobility is achieved in particular by way of a thread 9, 9'. In the case of desired opening, the wall section 8, 8' is removed from the squeezed seal 3', which as a result loses its sealing function and opens a passage, so that the two components K1, K2 can come into contact and/or react with one another. In one particular variant of this embodiment, when the packaging form is opened or shaken, the seal 3' becomes so loose that it falls into one chamber.

The seal 3' is manufactured from an elastic material of the kind typically used for the sealing of liquids.

FIG. 3*a*) shows a version with a thread 9, whereas FIG. 3*b*) has two threads 9, 9'. FIG. 3*b*) is advantageous over 3*a*) because in a first step the first chamber can be filled with a component K1 or K2, after which the seal 3' can be screwed on via a thread 9 and hence tightly sealed via the wall section 8, and only at a later point in time can this part, which has the function of a lid, be screwed onto the second part of the packaging form, with the other component, K2 or K1, with the second thread 9', and hence the second chamber as well can be closed off tightly via the wall section 8'.

FIG. 4 shows an embodiment P4 of a packaging form 6, respectively a pack 5 that is used. In this embodiment the dividing wall 3 is of extractable design. In this case, between the chambers, there is a thin dividing wall 3 which is extracted by means of external intervention, so that the two components K1, K2 can come into contact and/or react with one another. The connecting points in the region where the dividing wall is connected to the inside wall of the chambers 1, 2 have predetermined breakage points for this purpose. Particularly suitable for extraction are embodiments for which the dividing wall 3 is connected to a tearing tab 16. FIG. 4*a*) shows a version in which only the dividing wall 3 is connected to the inside walls of the chambers 1, 2. For this purpose, the connecting points in the region where the dividing wall is connected to the inside wall of the chambers 1, 2 has a predetermined breakage point, in the same way as the region where the tearing tab 16 is connected to the outer wall. In FIG. 4*b*), when the dividing wall is extracted, at the same time the cover 11, which is connected to the tearing tab 16 and the dividing wall, is separated from the packaging form as well, thereby producing an opening 10 through which the two components which have come into contact with one another can be removed from the pack.

FIG. 5 shows one preferred embodiment of embodiment P1. In this embodiment the first chamber 1 containing one component K1 is composed of a fragile glass or plastic ampoule 3. The second chamber 2 containing the other component K2 is likewise a fragile glass or plastic ampoule. The two ampoules are preferably arranged in a tube-in-tube arrangement or—as depicted—in an ampoule-in-ampoule arrangement. This ampoule arrangement is recessed in a receptacle whose outer walls 4 are manufactured from flexible plastic or cardboard. This plastic receptacle additionally has an opening 10 which is covered by a porous cover 20, in particular by a felt strip or a sponge. When the packaging form is activated, bending of the outer walls 4 or an impact on the outer walls of the plastic or cardboard receptacle cause the glass ampoules to break open, so that the components K1, K2 can mix and/or react. The reaction mixture soaks the felt or foam 20 and can be applied by contact thereof with a surface. The felt or foam, additionally, helps to prevent any splinters which may originate from the broken ampoule from emerging from the packaging form 5, 6. This embodiment P1 therefore represents a disposable packaging form for the application of a two-component aqueous adhesion promoter composition. It is especially suitable for small quantities. This packaging form is suitable in particular for the pre-treatment of a sheet of vehicle glazing, in particular a car window or screen.

Figure 6:
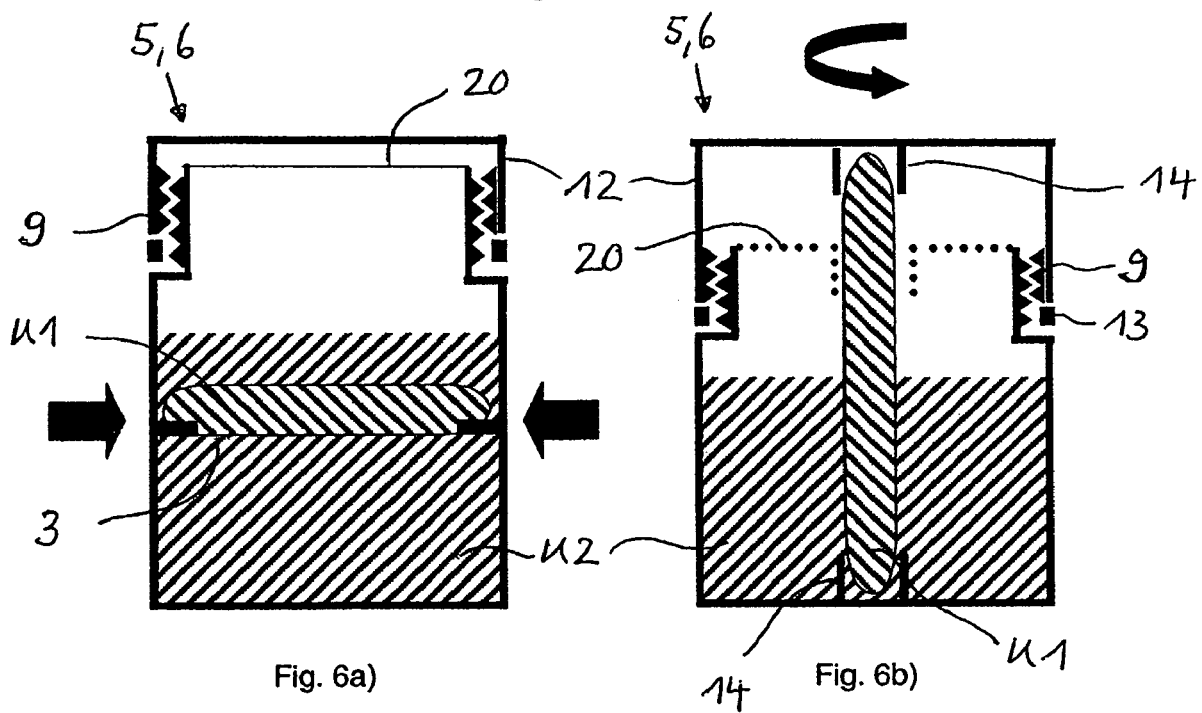

FIG. 6 shows a further preferred embodiment of embodiment P1. In this case a fragile glass or plastic ampoule 3 containing one component K1 is held in a bottle with a fixing means 14 that contains the other component K2. FIG. 6*a*) shows an embodiment with a horizontal ampoule 3. The ampoule in this case can be broken, where appropriate, by a rigid means, a metal spatula for example, so that the components K1, K2 can mix and/or react, or the ampoule can be made to burst by compression or impact of the bottle. The rigid means may be introduced through an opening in the bottle. After the means has been removed, the bottle can where appropriate be sealed and shaken. FIG. 6*b*) shows an embodiment with a vertical ampoule 3. The design of the ampoule is such that it is longer than the bottle height and protrudes into a fixing means 14 in the lid 12. The lid 12 carries a thread 9 and preferably has a safety tab 13, which prevents the lid 12 being rotated inadvertently. When activation is desired, the safety tab 13 is removed and the lid 12 is rotated, as a result of which the base of the lid 12 moves towards the ampoule 3 and places it under pressure for breaking or tearing, so that the components K1, K2 can mix and/or react. The lid closure ensures, furthermore, that the bottle is tight and can be shaken. In both embodiments, according to FIG. 6*a* and 6*b*, it is preferable to attach a felt or fine net 20 for the application of the reaction mixture after the components K1, K2 have been mixed, in order to prevent the emergence from the packaging form of any splinters which may come from the broken ampoule. It is preferred to use a felt or a sponge, since a felt or sponge is fully saturated by the two-component aqueous adhesion promoter composition and is therefore very suitable for applying said composition. The felt or sponge is typically connected to a shaped part which has a thread and can be screwed onto the thread 9 of the bottle.

FIG. 7 shows a further preferred embodiment of the embodiment P1. In this case, in a chamber 1, there is at least one metal ball as a mixing assistant 17. As a result of shaking, the dividing wall 3 present between the two chambers is broken or torn by the ball 17, so that the components K1, K2 can mix and/or react. As and when required, the ball 17 can be provided with points or edges in order to facilitate tearing of the dividing wall 3. The thickness and nature of the dividing wall 3 and also the amount and surface design of the balls 17 that are used are to be selected such that the dividing wall 3 can be destroyed by simple shaking of the packaging form 6, but not unintentionally, such as in the event of small vibrations as may occur in the course of transport. Besides the variant shown in FIG. 7*a*) with dividing wall 3 stretching between the outer walls 4, 4' between the chambers, in FIG. 7*b*) a modification of the ampoule 3 shown in FIG. 6 is depicted, which contains one component.

FIG. 8 shows a further preferred embodiment of the embodiment P1. In this embodiment one component K1 is packed in a chamber 1 which forms a bubble 21. In FIG. 8*a* the design of the bubble 21 is such that at its base it is connected to the dividing wall 3 and at that point has a predetermined breakage point. By removal of the safety tab 13 it is possible for the lid 12 to be rotated shut via the thread 9, as a result of which the base of the lid 12 moves towards the bubble. This squeezes the bubble 21 until the pressure produced is sufficiently great to rupture the predetermined breakage point, so that the components K1, K2 can mix and/or react. This embodiment is suitable in particular for low-viscosity components K1, K2. However, after the safety tab 13 has been removed, it is also possible to screw off the lid 12 and to squeeze the bubble 1, 2 manually by hand to press out the component contained in it. In FIG. 8*b*) the bubble 21 has a clamp closure 18. As a result of the squeezing of the wall of the passage between the chambers 1 and 2, that wall forms the dividing wall 3 which separates the two chambers 1, 2 from one another in the unopened state. On opening, the lid 12 is first screwed off by means of thread 9. Subsequently the clamp closure 18 is removed, thereby opening the passage between the chambers 1 and 2, so that components K1, K2 can mix and/or react. This may be assisted by the pressing-out of the bubble 21. In both embodiments, preferably, the bubble is designed such that it is connected to the wall 8 of the other chamber 2 in such a way that it can be easily removed in order to allow, subsequently, the affixing of a felt or a sponge, in particular by means of the thread 9, to the opening 10 for the purpose of applying the adhesion promoter composition.

FIG. 9 shows another preferred embodiment of the embodiment P1. In this case it takes the form of a bottle 5 or a double-hose pouch 5, which has two chambers 1, 2, which are separated from one another by a dividing wall 3 disposed in the lengthwise direction of the bottle or pouch. The outer walls 4, 4' of the bottle 5 or pouch 5 are manufactured from a highly elastic material, while the dividing wall 3 is manufactured either from a rigid material or in a very thin form. As a result of axial twisting of the bottle 5 or of the double pouch 5, the dividing wall is very severely stretched or loaded, so that the dividing wall 3 tears—depicted in FIG. 9'—so that the components K1, K2 can mix and/or react. At, its end the pouch or bottle preferably has a thread 9 with a tightly closing lid 12. After mixing or shaking has been carried out, this lid 12 can be opened and the reaction mixture can be applied to a surface. In addition, with preference, it is possible to screw a felt onto this thread 9.

Figure 10:
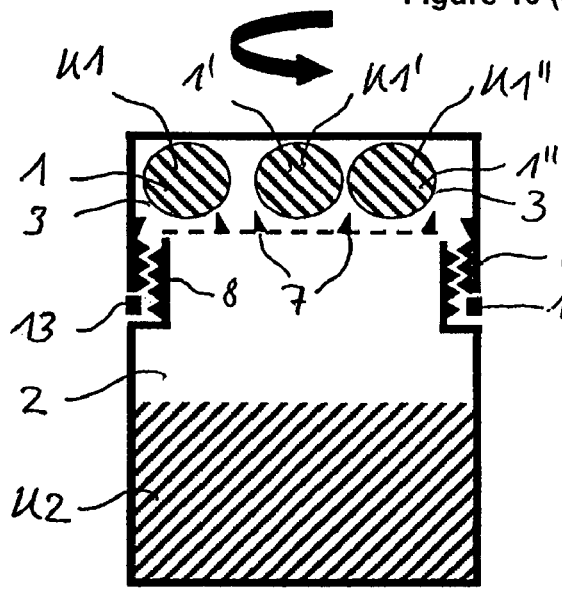
FIG. 10 shows a cross section through preferred embodiments of P2

FIG. 10 shows a preferred embodiment of embodiment P2. In this case one chamber 1 forms a part of the lid 12 of a bottle 5. FIGS. 10*a*)-*f*) show different preferred arrangements in this context.

In FIG. 10*a*) the cutting means 7 are connected to the wall 8 or lie on it, in the form for example of a ring, and are directed towards the dividing wall 3 of the chamber 1, 2. By removal of the safety tab 13 it is possible for the lid 12 and hence the chambers 1, 2 to be moved by way of the thread 9', by rotation, towards the cutting means 7. When the cutting means 7 make contact with the dividing wall 3, which is manufactured from a severable material, the wall 3 is cut through, so that the components K1, K2 can mix and/or react. If the cutting means 7 are arranged excentrically in relation to the axis of rotation of the lid 12—as shown in FIG. 10*a*)—then further rotation of the lid produces an incision in the form of a curve in the dividing wall 3, so that the dividing wall can be folded away or even cut out, which is very advantageous for the mixing of components K1, K2.

In FIG. 10*b*) a plurality of cutting means 7 are arranged in distribution over the opening of the bottle. Between the cutting means there are passages for the component K1, K2 in the chamber 1, 2. This type is typically achieved by means of a perforated plate or net with points which is directed against the dividing wall, and which lies on or is connected to the wall 8. By removal of the safety tab 13 it is possible for the lid 12 and hence the chamber 1, 2 to be moved by way of the thread 9', by means of rotation, towards the cutting means 7. When the cutting means 7 make contact with the dividing wall 3, which is manufactured from a severable material, the wall 3 is cut through, so that the components K1, K2 can mix and/or react. The presence of a plurality of cutting means 7 arranged in this way has the advantage that at the same time the dividing wall 3 is perforated at a number of locations simultaneously and hence the dividing wall is efficiently destroyed.

Figure 10C:
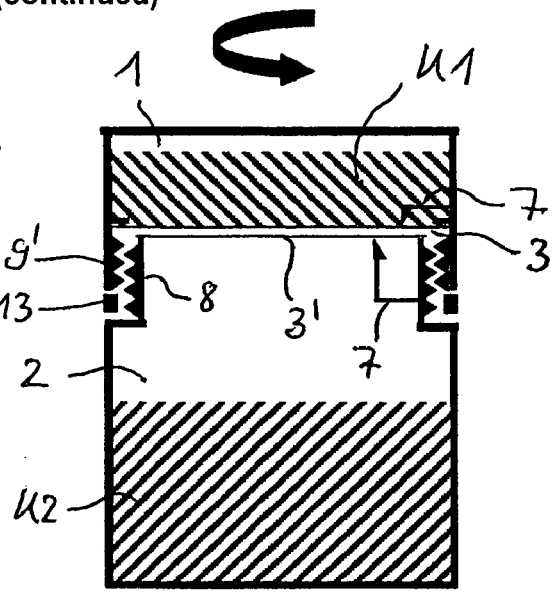

In FIG. 10*c*) the component K1 is packed in different chambers 1, 1', 1" which form a part of the lid 12. These chambers 1, 1', 1" may be filled balls or pouches manufactured from a severable or rupturable material. Furthermore it is possible in principle for these chambers 1, 1', 1" to be able to contain different components K1, K1', K1". Thus, for example, it would be possible to realise three-component or multicomponent adhesion promoter compositions in such a way, which would not be suitable for storage with one another or would lead to relatively poor adhesion promoter properties. A plurality of cutting means 7 are arranged in distribution over the opening of the bottle. Between the cutting means there are passages for component K1 in chamber 1. Typically this kind is achieved by means of a perforated plate or net which has points and is directed against the dividing wall, and which lies on or is connected to the wall 8. By removal of the safety tab 13 it is possible for the lid 12 and hence the chamber 1 to be moved by way of the thread 9', by means of rotation, towards the cutting means 7. When the cutting means 7 make contact with the dividing wall 3 the wall 3 is cut through or ruptured, so that the components K1, K2 can mix and/or react.

Figure 10D:
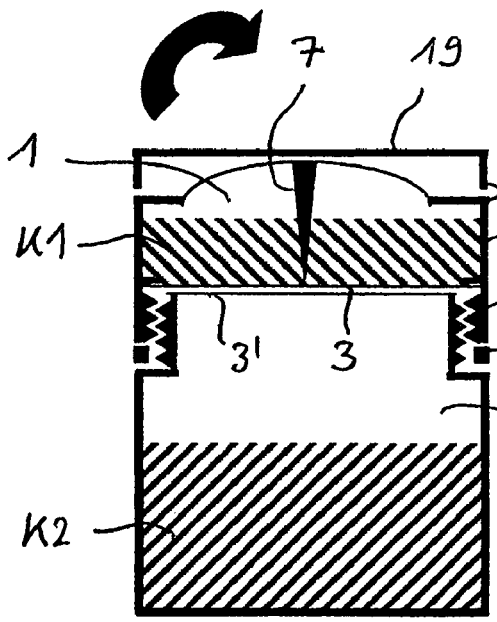

In FIG. 10*d*) the component K1 is stored in a chamber 1, which is manufactured from a severable film and forms a part of the lid 12. The other chamber 2 is sealed with a dividing wall 3'. In both chambers cutting means 7 are mounted close to the two dividing walls 3, 3'. By removal of the safety tab 13 it is possible for the lid 12 to be rotated by way of the thread 9', as a result of which the cutting means 7 move towards one another and in this case cut through the dividing walls 3, 3', so that the components K1, K2 can mix and/or react. This embodiment possesses the advantage that both chambers 1 and 2 can be filled with the respective component K1, K2 and can be stored imperviously separately from one another.

Figure 10E:
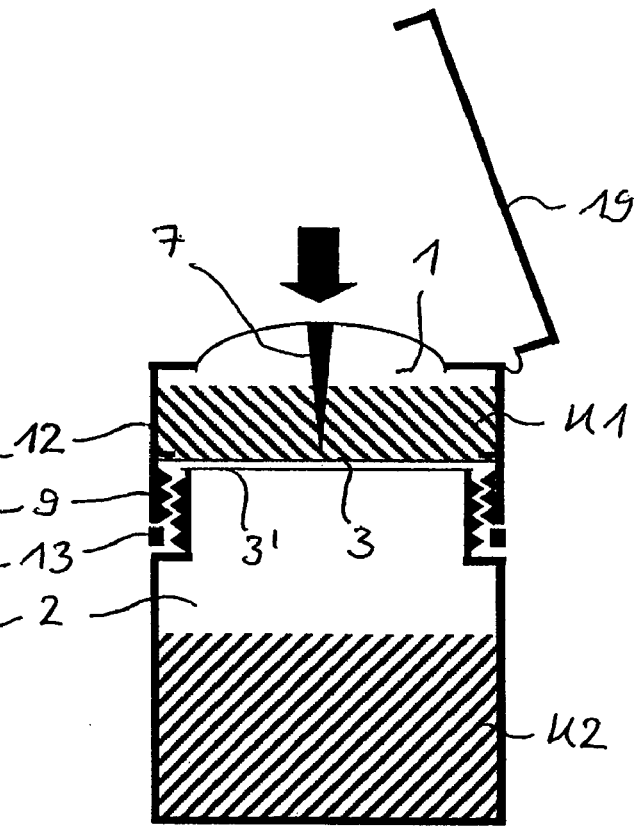

In FIG. 10*e*) an embodiment is shown in which one chamber 1 forms part of the lid 12, which is typically connected to the bottle with a thread 9, and where the lid has a protective cover 19 which can be folded open. Situated beneath this protective cover is one chamber 1. This chamber is manufactured from a deformable and severable material, a polymeric film, a metal foil or a composite sheet, for example. Mounted on the inside of the chamber, on the side facing the protective cover, is a cutting means 7. This part of the chamber typically has a convexity towards the outside. When mixing is desired, the protective cover 19 is folded open—depicted in FIG. 10*e'*)—and pressure is subsequently applied to the convexity, as a result of which the cutting means 7 is pressed onto the dividing walls 3, 3', so that these walls tear and the components K1, K2 can mix and/or react.

The embodiment described in FIG. 10*f*) is very similar to that of FIG. 10*e*) with the cover. In this case one chamber 1 is part of the lid 12. The chamber is manufactured from a severable material. The other chamber 2 is closed off by a dividing wall 3, which is likewise manufactured from a severable material. In the unopened state the two walls 3, 3' which delimit the two chambers 1, 2 are arranged very close, preferably in contact with one another. By removal of the safety tab 13 and rotation of the lid 12 it is possible for the said lid, together with the chamber 1, 2 and also the cutting means 7, by way of the thread 9', to be moved towards the dividing wall 3. When cutting means 7 come into contact with the dividing walls 3, these walls are cut through, so that the components K1, K2 can mix and/or react. This embodiment as well possesses the advantage that both chambers 1 and 2 can be filled with the respective component K1, K2 and stored imperviously separately from one another.

FIG. 11 shows a preferred embodiment of embodiment P4. In this case the two chambers 1, 2 are separated from one another by an extractable dividing wall. In FIG. 11*a*) this dividing wall 3 is connected, additionally, to wall 8 and 8', respectively, of the respective chamber 1, 2, and so forms a cover 11 to the opening 10. On extraction, first of all the cover 11 is opened by means of a tab 16. Thereafter the dividing wall 3 is extracted by means of the predetermined breakage points, which are located at the points where the dividing wall is connected to the inside wall of the chambers 1, 2, so that the components K1, K2 can mix and/or react. The lid can then be screwed on again and shaking, for example, can take place. Furthermore, for the purpose of application, a felt or sponge can be mounted on the opening 10; in particular it can be screwed on by means of the thread 9.

In FIG. 11*b*) the extractable dividing wall 3 is designed in such a way that it has a tearing tab 16 at the base of the chambers 1, 2. This tearing tab 16 is connected, furthermore, to the cover 11 which closes the opening 10 of the bottle. After the lid 12 has been removed the cover 11 can be removed and then it is possible to pull on the tearing tab 16 or directly on the tab 16, so that the dividing wall 3 detaches from the bottom, by peeling, from the inside walls of the chambers, at the predetermined breakage points, so that the components K1, K2 can mix and/or react. The dividing wall can be produced, for example, by lightly welding a film tape to the inside wall of a bottle. The tearing tab 16 is typically the rest of this film tape.

In all of the figures the first component K1 can be present in the first chamber 1 and the second component K2 can be present in the second chamber 2 or else the first component K1 can be present in the second chamber 2 and the second component K2 can be present in the first chamber 1.

The size of the chambers is preferably such that at least one chamber 1, 2 has a greater volume than the volume of the component K1, K2 present within it. With particular preference the volume not occupied by the said component corresponds at least to the volume of the other component.

Moreover, the volume ratio K1/K2 of the first component K1 to the second component K2 is between 1000/1 and 1/1000, in particular between 200/1 to 10/1 or between 1/200 to 1/10. With preference the volume ratio K1/K2 is between 200/1 to 20/1 or between 1/200 to 1/20.

Although component K1 exhibits improved storage stability, the walls of the chambers may be composed of one or more materials which are impervious to diffusion of water in liquid or gaseous state or at least so impermeable that the desired storage stability is not adversely affected. Particularly suitable for this purpose are aluminium or glass or composites. Thus it is possible, for example, to store component 1 in an aluminium pouch or in a plastic pouch coated with aluminium. This kind of chamber has the advantage that the wall can be severed at any point and so does not require precise positioning of the pouch. Pouches of this kind are suitable in particular for the g embodiments according to FIG. 10.

The packaging form 6 is produced by filling of the chambers 1 and 2 with the components K1, K2, followed where appropriate by the assembly of the pack. The packaging form has a good storage stability, typically of at least 6 months, in particular of at least 9 months. If the packaging form 6 is to be used to apply an adhesion promoter, it can be activated specifically. For this purpose the dividing wall 3 must be removed or severed so that the components K1, K2 can make contact, mix and/or react. Mixing may be assisted by shaking. Subsequently the adhesion promoter composition prepared in this way is removed from the packaging form 6 and applied to a surface to be bonded or sealed. Depending on the nature of the selected constituents in components K1 and K2 it may be necessary to allow a short time, typically less than half an hour, to elapse between contacting of the two components and application, in order to achieve an optimum adhesion promoter effect. Preferably, however, the adhesion promoter composition is applied immediately. The surface may be composed of very different material, particular preference being given to glass, glass ceramics, metals, paints and plastics. Where appropriate it may be necessary for the surface to be pretreated, prior to application of the adhesion promoter, by further chemical, physical or physicochemical methods. For application it is preferred to mount a porous cover 20, in particular a felt or a sponge, on a packaging form 6 with opening 10. A porous cover 20 of this kind is typically affixed to a shaped part which ensures, in the edge region, a connection with the pack. This connection is achieved preferably by way of a screw connection via a thread 9. The two-component adhesion promoter composition is applied in a film thickness of less than 1 millimeter, typically in a film thickness of less than 100 micrometers. If the adhesion promoter composition comprises fillers and/or binders, a film thickness between 1 and 100 micrometers, in particular between 1 and 20 micrometers, is preferred. If the adhesion promoter composition contains no fillers and no binder, a film thickness is preferred which is between one molecular monolayer of the compound A and 50 micrometers, in particular between 2 nanometers and 10 micrometers, in particular between 10 nanometers and 1 micrometer.

List of Reference Symbols

| | |
|---|---|
| K1 | first component |
| K2 | second component |
| 1 | first chamber |
| 2 | second chamber |
| 3 | dividing wall |
| 3' | seal |
| 4 | outer wall |
| 4' | outer wall |
| 5 | pack |
| 6 | packaging form |
| 7 | cutting means |
| 8 | wall section |
| 8' | wall section |
| 9 | thread |
| 9' | thread |
| 10 | opening |
| 11 | cover |
| 12 | lid |
| 13 | safety tab |
| 14 | fixing means |
| 15 | mixing assistants |
| 16 | tearing tab |
| 17 | mixing assistants |
| 18 | clamp closure |
| 19 | protective cover |
| 20 | porous cover |
| 21 | bubble |

EXAMPLES

TABLE 1

Organoalkoxysilanes used.

| Abbreviation | Organoalkoxysilane |
|---|---|
| A1110 | 3-aminopropyltrimethoxysilane |
| A1120 | N-(2-aminoethyl)-3-aminopropyltrimethoxysilane |
| A1130 | 3-[2-(2-aminoethylamino)ethylamino]propyl-trimethoxysilane |
| A1170 | bis(trimethoxysilylpropyl)amine |

TABLE 1-continued

Organoalkoxysilanes used.

| Abbreviation | Organoalkoxysilane |
|---|---|
| Dy1122 | bis(triethoxysilylpropyl)amine |
| A187 | 3-glycidyloxypropyltrimethoxysilane |
| GLYEO | 3-glycidyloxypropyltriethoxysilane |
| A189 | 3-mercaptopropyltrimethoxysilane |
| A174 | 3-methacryloyloxypropyltrimethoxysilane |
| MTMS | methyltrimethoxysilane |

Furthermore, the reaction product RP1 was prepared from 3-glycidyloxypropyltrimethoxysilane and N-(2-aminoethyl)-3-aminopropyltrimethoxysilane, by mixing 1 mol of A1120 with 3 mol of A187. Immediately after mixing it was possible to check the conversion by IR. The band at about 910 cm$^{-1}$ which is characteristic of the epoxy group can in fact still be detected immediately after mixing, but rapidly disappears.

TABLE 2

Surfactants used.

| Abbreviation | Surfactant | Supplier |
|---|---|---|
| Surfynol | Surfynol ® 61 | Air Products |
| Soprophor | Soprophor BSU | Rhodia, Germany |
| FM33 | Antarox FM33 | Rhodia, Germany |
| AE 01 | EnviroGem ® AE 01 | Air Products |
| AE 02 | EnviroGem ® AE 02 | Air Products |
| Hydropalat 120 | Hydropalat ® 120 | Cognis, Germany |
| FSO-100 | Zonyl ® FSO-100 | ABCR, Germany |
| Byk 333 | BYK ®-333 | Byk-Chemie GmbH, Germany |

In Table 3 the ratio of organoalkoxysilane to surfactant was varied. The organoalkoxysilane used was the reaction product RP1 and it was combined with different surfactants.

In the first reference series Ref.S1 no surfactant was used, i.e. pure organoalkoxysilane was used.

The respective surfactant was added to 2.5 g of reaction product RP1 in a glass vessel (diameter 12 mm, 4 cm high, volume about 4.5 ml, with plastic screw lid), which beforehand had been dried in an oven at 200° C. for one day and cooled to room temperature at 25° C./50% relative humidity. Subsequently the vessels thus filled were closed with lids and stored in an oven (Ehret, TK/L 4061) with circulating air at 50° C. Over 30 days the samples were visually inspected daily. Table 2 reports the stability, specifically by reporting the number of days until the sample was observed to gel. If the sample was still perfect after day 30, the value >30 was reported.

TABLE 3

Stability (number of days to gel) of organoalkoxysilane/surfactant mixtures at 50° C. in a closed vessel.

| | RP1:surfactant [g:g] | | | | | | |
|---|---|---|---|---|---|---|---|
| | 1:0 | 20:1 | 10:1 | 5:1 | 2:1 | 1:1 | 1:2 |
| Surfactant | Ref. S1 | BS1 | BS2 | BS3 | BS4 | BS5 | BS6 |
| Surfynol | 1 | 1 | 1 | 2 | >30 | >30 | >30 |
| Soprophor | 1 | 1 | 1 | 1 | >10 | >30 | >30 |
| AE 01 | 1 | 1 | 3 | 3 | 10 | >30 | >30 |
| Hydropalat 120 | 1 | 1 | 1 | 2 | >30 | >30 | >30 |
| Proportion of S in composition [% by wt.] | 100 | 95 | 91 | 83 | 66 | 50 | 33 |

In Table 4, different silanes and different surfactants, in a mixing ratio S:T of 2.125:1, corresponding to an organoalkoxysilane S fraction of 68% by weight as a proportion of the total weight of the overall composition, were mixed as described above.

In this series of tests, however, a drill was used to drill a hole of 1 mm in the lid. The storage and determination of stability took place as for the experiments of Table 3. The comparative experimental series Ref.S2 took place without addition of surfactants, i.e. as pure organoalkoxysilanes.

TABLE 4

Stability (number of days to gel) of organoalkoxysilane/surfactant mixtures at 50° C. in a vessel with a hole in the lid.

| | BS7 Surfynol | BS8 AE 01 | BS9 Hydropalat 120 | Ref. S2 |
|---|---|---|---|---|
| A1130 | 7 | 1 | 6 | 1 |
| A1170 | 1 | 4 | 1 | 1 |
| MTMS | >30 | >30 | 10 | 1 |

In a further experimental series the storage stabilities of compositions containing reaction products of aminosilanes and epoxysilanes with different surfactants were compared.

In this case the reaction product RP1 already described was used. In addition a reaction product RP2 was prepared from 3-glycidyloxypropyltrimethoxysilane and 3-[2-(2-aminoethylamino)ethylamino]propyltrimethoxy-silane, by mixing 1 mol of A1130 with 6.6 mol of A187.

In Table 5 RP1 or RP2 was mixed with different surfactants in a mixing ratio S:T of 2.125:1, corresponding to an organoalkoxysilane S fraction of 68% by weight as a proportion of the total weight of the overall composition, as described above. In this experimental series the vessel with a sealed lid (without a hole as for Table 4) was stored at 50° C. as already described in the oven, or at 23° C./50% relative humidity. The stability was determined as for the experiments of Table 3. The comparative experimental series Ref.S3 took place without the addition of surfactants, i.e., as pure organoalkoxysilanes.

TABLE 5

Stability (number of days to gel) of organoalkoxysilane/surfactant mixtures at 50° C. and 23° C. in a sealed vessel.

| | | RP1 | | RP2 | |
|---|---|---|---|---|---|
| | Surfactant | 23° C. | 50° C. | 23° C. | 50° C. |
| BS10 | Surfynol | >90 | >90 | >90 | >90 |
| BS11 | Soprophor | 84 | >90 | 84 | >90 |
| BS12 | FM33 | 25 | >90 | 74 | 74 |
| BS13 | AE 01 | >90 | 29 | >90 | 1 |
| BS14 | AE 02 | >90 | 1 | >90 | >90 |
| BS15 | Hydropalat 120 | >40 | >40 | >40 | >40 |
| Ref. S3 | No surfactant | 9 | 1 | 32 | 8 |

In Table 6 the miscibility of component K1 in component K2 was determined. In this case 0.5 g of the respective mixture of surfactant/reaction product RP1 was added as component K1 to 25 g of 1% by weight acetic acid, as component K2 using a pipette. The assessment reported in Table 6' is made in accordance with the following code:
"−" formation of drops on the base of the vessel (phase separation)
"+" the droplets formed initially quickly dissolve (<1 minute)
"++" spontaneous dissolution during addition

TABLE 6

Miscibility of component K1 and K2.

| | RP1:surfactant [g:g] | | | | | | |
|---|---|---|---|---|---|---|---|
| | 1:0 | 20:1 | 10:1 | 5:1 | 2:1 | 1:1 | 1:2 |
| Surfactant | Ref. S4 | BS16 | BS17 | BS18 | BS19 | BS20 | BS21 |
| Surfynol | − | − | − | ++ | ++ | ++ | ++ |
| Soprophor | − | ++ | ++ | ++ | ++ | ++ | ++ |
| AE 01 | − | + | + | + | + | + | + |
| Hydropalat 120 | − | − | − | + | ++ | ++ | ++ |

Table 7 reports the behaviour of different organoalkoxysilanes. The evaluation figures are reported correspondingly to those in Table 6.

TABLE 7

Compositions of aqueous adhesion promoter compositions.

| | Ref. 1 | Ref. 2 | B1 | Ref. 3 | Ref. 4 | B2 | Ref. 5 |
|---|---|---|---|---|---|---|---|
| K1 | | | | | | | |
| A187 [g] | 0.5 | 0.5 | 0.33 | | | | |
| A189 [g] | | | | 0.5 | 0.5 | 0.33 | |
| A174 [g] | | | | | | | 0.5 |
| A1170 [g] | | | | | | | |
| Surfynol [g] | | 0.17 | | | 0.17 | | |
| K2 | | | | | | | |
| H₂O [g] | 25.0 | 24.75 | 24.75 | 25.0 | 24.75 | 24.75 | 25.0 |
| HAc* [g] | | 0.25 | 0.25 | | 0.25 | 0.25 | |
| K1 + K2 [g] | 25.5 | 25.5 | 25.5 | 25.5 | 25.5 | 25.5 | 25.5 |
| Solubility | − | − | ++ | − | − | ++ | − |

| | Ref. 6 | B3 | Ref. 7 | B4 |
|---|---|---|---|---|
| K1 | | | | |
| A187 [g] | | | | |
| A189 [g] | | | | |
| A174 [g] | 0.5 | 0.33 | | |
| A1170 [g] | | | 0.5 | 0.33 |
| Surfynol [g] | | 0.17 | | 0.17 |
| K2 | | | | |
| H₂O [g] | 24.75 | 24.75 | 25.0 | 24.75 |
| HAc* [g] | 0.25 | 0.25 | | 0.25 |
| K1 + K2 [g] | 25.5 | 25.5 | 25.5 | 25.5 |
| Solubility | − | ++ | − | ++ |

*HAc = acetic acid (100%)

TABLE 8

Compositions of aqueous adhesion promoter compositions.

| | B5 | B6 | B7 | B8 | Ref. 8 | Ref. 9 |
|---|---|---|---|---|---|---|
| K1 | | | | | | |
| A1170 [g] | 0.75 | | | | | |
| Dy1122 [g] | | 0.75 | | | | |
| A187 [g] | | | 0.75 | | 0.75 | |
| GLYEO [g] | | | | 0.75 | | 0.75 |
| Byk 333 [g] | 0.25 | 0.25 | 0.25 | 0.25 | 0.25 | 0.25 |
| FSO-100 [g] | 0.05 | 0.05 | 0.05 | 0.05 | 0.05 | 0.05 |

TABLE 8-continued

Compositions of aqueous adhesion promoter compositions.

|  | B5 | B6 | B7 | B8 | Ref. 8 | Ref. 9 |
|---|---|---|---|---|---|---|
| K2 | | | | | | |
| HAc* [g] | 0.25 | 0.25 | 0.25 | 0.25 | | |
| Water [g] | 48.7 | 48.7 | 48.7 | 48.7 | 48.95 | 48.95 |
| K1 + K2 [g] | 50 | 50 | 50 | 50 | 50 | 50 |
| Solubility | ++ | ++ | ++ | ++ | − | − |

*HAc = acetic acid (100%)

The aqueous adhesion promoter compositions prepared in Table 8 were applied, after the time indicated in Tables 9 and 10 as hydrolysis time after the mixing of the components K1 and K2, by means of a cellulose cloth impregnated with them (Tela® cloth, Tela-Kimberly Switzerland GmbH), application taking place to float glass (tin side, Rocholl GmbH, Germany), or to the ceramic edge of an ESG BMW rear screen from Saint-Gobain Sekurit ("ceramic"). After a flash-off time of 10 minutes the one-component moisture-curing polyurethane adhesive Sikaflex®-250 DM-2 ("DM2") or SikaTack®-Move Goes Cool ("MGC"), which both contain polyurethane prepolymers with isocyanate groups and are available commercially from Sika Schweiz AG, was applied as a flat triangular bead using a cartridge press and a nozzle, and cured at 23° C. and 50% relative humidity (climatic storage "KL") for 7 days. Thereafter the samples were stored in water at 23° C. for 7 further days (water storage, "WL"), and finally were stored for a further 7 days at 70° C. and 100% relative humidity (hot wet storage "CP").

The adhesion was assessed by means of the bead test.

Adhesion test ("bead test")

The adhesion of the adhesive was tested by means of the 'bead test'. In this test an incision is made at the end just above the adhesion face. The incised end of the bead is held with round pliers and pulled from the substrate. This is done by carefully rolling up the bead on the tip of the pliers, and placing a cut vertical to the bead pulling direction down to the bare substrate. The rate of bead removal is selected so that a cut has to be made about every 3 seconds. The test length must amount to at least 8 cm. An assessment is made of the adhesive which remains on the substrate after the bead has been pulled off (cohesive fracture).

The adhesion properties are evaluated by estimation of the cohesive fracture of the adhesion face:

1=>95% cohesive fracture
2=75-95% cohesive fracture
3=25-75% cohesive fracture
4=<25% cohesive fracture
5=0% cohesive fracture (purely adhesive fracture)

Test results with evaluations of 4 or 5 are considered inadequate.

TABLE 9

Adhesion of adhesives to aqueous adhesion promoter compositions after different hydrolysis times on float glass.

| | Hydrolysis time: 10 min | | | | | | Hydrolysis time: 1 h | | | | | |
|---|---|---|---|---|---|---|---|---|---|---|---|---|
| | DM-2 | | | MGC | | | DM2 | | | MGC | | |
| | KL | WL | CP | KL | WL | CP | KL | WL | CP | KL | WL | CP |
| B5 | 1 | 1 | 1 | 1 | 2 | 1 | 2 | 2 | 2 | 2 | 2 | 1 |
| B6 | 1 | 1 | 1 | 1 | 1 | 1 | 1 | 1 | 1 | 1 | 1 | 1 |
| B7 | 2 | 2 | 1 | 2 | 3 | 1 | 2 | 3 | 1 | 2 | 4 | 1 |
| B8 | 2 | 3 | 2 | 3 | 4 | 1 | 1 | 2 | 1 | 3 | 4 | 2 |
| Ref. 8 | 4 | 4 | 4 | 5 | 5 | 4 | 2 | 2 | 2 | 5 | 5 | 4 |
| Ref. 9 | 5 | 4 | 4 | 5 | 5 | 4 | 5 | 5 | 4 | 5 | 5 | 4 |

| | Hydrolysis time: 2 h | | | | | |
|---|---|---|---|---|---|---|
| | DM-2 | | | MGC | | |
| | KL | WL | CP | KL | WL | CP |
| B5 | 2 | 1 | 1 | 3 | 3 | 1 |
| B6 | 1 | 1 | 1 | 1 | 2 | 1 |
| B7 | 1 | 2 | 2 | 1 | 4 | 1 |
| B8 | 1 | 3 | 1 | 1 | 3 | 1 |
| Ref. 8 | 1 | 1 | 2 | 4 | 5 | 4 |
| Ref. 9 | 3 | 4 | 4 | 5 | 5 | 4 |

TABLE 10

Adhesion of adhesives to aqueous adhesion promoter compositions after different hydrolysis times on ceramic.

| | Hydrolysis time: 10 min | | | | | | Hydrolysis time: 1 h | | | | | |
|---|---|---|---|---|---|---|---|---|---|---|---|---|
| | DM-2 | | | MGC | | | DM2 | | | MGC | | |
| | KL | WL | CP | KL | WL | CP | KL | WL | CP | KL | WL | CP |
| B5 | 1 | 1 | 1 | 1 | 1 | 1 | 1 | 1 | 1 | 1 | 1 | 1 |
| B6 | 1 | 1 | 1 | 1 | 1 | 1 | 1 | 1 | 2 | 1 | 1 | 1 |
| B7 | 1 | 1 | 1 | 2 | 2 | 1 | 1 | 1 | 1 | 2 | 2 | 1 |
| B8 | 1 | 2 | 2 | 2 | 2 | 1 | 1 | 1 | 2 | 1 | 2 | 1 |
| Ref. 8 | 5 | 5 | 5 | 5 | 5 | 4 | 4 | 4 | 4 | 5 | 5 | 5 | 4 |
| Ref. 9 | 5 | 5 | 5 | 5 | 5 | 5 | 5 | 5 | 5 | 5 | 5 | 5 |

| | Hydrolysis time: 2 h | | | | | |
|---|---|---|---|---|---|---|
| | DM-2 | | | MGC | | |
| | KL | WL | CP | KL | WL | CP |
| B5 | 1 | 1 | 2 | 1 | 1 | 1 |
| B6 | 1 | 1 | 2 | 1 | 1 | 1 |
| B7 | 1 | 1 | 2 | 2 | 2 | 1 |
| B8 | 1 | 1 | 2 | 1 | 1 | 1 |
| Ref. 8 | 2 | 2 | 2 | 5 | 5 | 3 |
| Ref. 9 | 5 | 4 | 5 | 5 | 5 | 5 |

Organoalkoxysilane compositions prepared from A1110 and different surfactants, in the ratios indicated in Table 11, were prepared and used as a first component K1 of an aqueous primer. The second component K2 consisted of water and 1% by weight acetic acid. 1.05 g of component K1 were introduced into 49 g of component K2 and the mixture was shaken. This mixture was subsequently applied to the ceramic edge of a VSG front screen of a Mitsubishi Space Wagon from Splintex, by means of a cellulose cloth soaked with the mixture (Tela® cloth, Tela-Kimberly Switzerland GmbH). After a flash-off time of 10 minutes the one-component moisture-curing polyurethane adhesive Sikaflex®-250 DM-2 or Sikaflex®-250 HMV-2+, which both contain polyurethane prepolymers with isocyanate groups and are available commercially from Sika Schweiz AG, were applied as a circular bead using a cartridge press and a nozzle and were cured at 23° C. and 50% relative humidity for 4 days. The adhesion was assessed by means of the bead test already described.

TABLE 11

Aqueous primers with silane/surfactant mixture in component K1. Adhesion of Sikaflex ® 250 DM-2

| | Sikaflex ® 250 DM-2 A1110:surfactant [g:g] | | | | |
|---|---|---|---|---|---|
| Surfactant | 1:0 Ref. S5 | 2:1 BS22 | 1:1 BS23 | 1:2 BS24 | 1:10 Ref. S6 |
| Surfynol | 2 | 1 | 2 | 3 | 3 |
| Soprophor | 2 | 1 | 2 | 2 | 3 |
| Hydropalat 120 | 2 | 1 | 2 | 2 | 3 |
| Proportion of S in comp. K1 [% by wt.] | 100 | 66 | 50 | 33 | 9 |

TABLE 12

Aqueous primers with silane/surfactant mixture in component K1. Adhesion of Sikaflex ® 250 HMV-2+

| | Sikaflex ® 250 HMV-2+ A1110:surfactant [g:g] | | | | |
|---|---|---|---|---|---|
| Surfactant | 1:0 Ref. S7 | 2:1 BS25 | 1:1 BS26 | 1:2 BS27 | 1:10 Ref. S8 |
| Surfynol | 4 | 4 | 4 | 3 | 5 |
| Soprophor | 4 | 1 | 2 | 4 | 4 |
| Hydropalat 120 | 4 | 3 | 3 | 4 | 4 |
| Proportion of S in comp. K1 [% by wt.] | 100 | 66 | 50 | 33 | 9 |

The invention claimed is:

1. An aqueous two-component adhesion promoter composition comprising two components, the first component, K1, comprising:
at least one organoalkoxysilane S that is a reaction product of a compound containing at least one epoxy group with an aminosilane of the formula (III) or (IV):

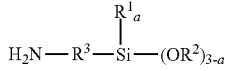

(III)

$$H_2N-R^3-\underset{\underset{R^1_a}{|}}{Si}-(OR^2)_{3-a}$$

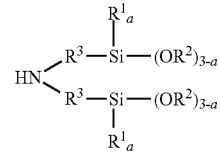

(IV)

$$HN\begin{cases} R^3-\underset{\underset{R^1_a}{|}}{Si}-(OR^2)_{3-a} \\ R^3-\underset{\underset{R^1_a}{|}}{Si}-(OR^2)_{3-a} \end{cases}$$

wherein $R^1$ is an alkyl group having 1 to 8 C atoms;
$R^2$ is an alkyl group having 1 to 5 C atoms;
$R^3$ is a linear or branched alkyl group having 1 to 4 C atoms;
a is the value 0, 1 or 2;
and
at least one anhydrous surfactant T,
wherein the weight total of organoalkoxysilane S and surfactant T is more than 90% by weight, based on the weight of component K1;
the second component, K2, comprising:
water, and
at least one acid;
wherein the at least one acid is present in an amount such that after components K1 and K2 have been mixed the resulting mixture gives an acidic reaction, wherein the at least one acid is an organic acid which contains a sulphur atom or a phosphorus atom.

2. An aqueous two-component adhesion promoter composition according to claim 1, wherein the acid is an aromatic sulphonic acid.

3. An aqueous two-component adhesion promoter composition according to claim 1, wherein the acid is present in an amount such that, after components K1 or K2 have been mixed, the resulting mixture has a pH of between 3 and 5.

4. An aqueous two-component adhesion promoter composition according to claim 1, wherein the compound containing at least one epoxy group is an epoxysilane of the formula (VI);

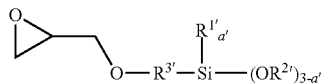

(VI)

wherein $R^{1'}$ is an alkyl group having 1 to 8 C atoms, $R^{2'}$ is an alkyl group having 1 to 5 C atoms, $R^{3'}$ is a linear or branched alkylene group having 1 to 4 C atoms, and a' is 0, 1 or 2.

5. An aqueous two-component adhesion promoter composition according to claim 1, wherein a=0 and $R^2$ is methyl and $R^5$ is propylene.

6. An aqueous two-component adhesion promoter composition according to claim 1, wherein the weight fraction of organoalkoxysilane S is $\geq$ 40% by weight, based on the weight of component K1.

7. An aqueous two-component adhesion promoter composition according to claim 1, wherein the weight ratio of organoalkoxysilane S to anhydrous surfactant T(S:T) has a value of 20:1 to 1:2.

8. An aqueous two-component adhesion promoter composition according to claim 1, wherein the weight fraction of water is $\geq$60% by weight, based on the weight of component K2.

9. An aqueous two-component adhesion promoter composition according to claim 1, wherein $R^1$ is a methyl group or an ethyl group, wherein $R^2$ is a methyl group or an ethyl group or an isopropyl group, wherein $R^3$ is a propylene group, and a has the value 0 or 1.

10. An aqueous two-component adhesion promoter composition according to claim 9, wherein $R^1$ is a methyl group, wherein $R^2$ is a methyl group or an ethyl group, wherein $R^3$ is a propylene group, and a has the value 0.

11. An aqueous two-component adhesion promoter composition according to claim 1, wherein the compound containing at least one epoxy group is an epoxysilane.

12. An aqueous two-component adhesion promoter composition according to claim 1, wherein the at least one acid is an organic sulphonic acid.

13. An aqueous two-component adhesion promoter composition according to claim 1, wherein the at least one acid is present in an amount such that after components K1 and K2 have been mixed the resulting mixture has a pH of 3.5 to 4.5.

14. An aqueous two-component adhesion promoter composition according to claim 2, wherein the acid is p-toluenesulphonic acid or dodecylbenzylsulphonic acid.

15. An aqueous two-component adhesion promoter composition comprising two components, the first component, K1, comprising:

at least one organoalkoxysilane S selected from the group consisting of aminosilanes, epoxysilanes, mercaptosilanes, (meth)acrylatosilanes and alkylsilanes, and at least one anhydrous surfactant T, wherein the weight total of organoalkoxysilane S and surfactant T is more than 90% by weight, based on the weight of component K1;

the second component, K2, comprising:

water, and at least one acid;

wherein the at least one acid is present in an amount such that after components K1 and K2 have been mixed the resulting mixture has a pH of 3.5 to 4.5, wherein the at least one acid is an inorganic acid having a sulphur atom or phosphorus atom.

16. An aqueous two-component adhesion promoter composition according to claim 15, wherein the weight fraction of the organoalkoxysilane S is ≧40% by weight, based on the weight of component K1.

17. An aqueous two-component adhesion promoter composition according to claim 7, wherein the weight ratio of organoalkoxysilane S to anhydrous surfactant T(S:T) has a value of 5:1 to 1:2.

18. An aqueous two-component adhesion promoter composition according to claim 17, wherein the weight ratio of organoalkoxysilane S to anhydrous surfactant T(S:T) has a value of 3:1 to 2:3.

19. Packaging comprising a pack including two chambers separated from one another by at least one dividing wall; and an aqueous two-component adhesion promoter composition according to claim 1, wherein the first component K1 is present in the first chamber and the second component, K2, is present in the second chamber.

20. Packaging according to claim 19, wherein the dividing wall is manufactured from a material which ruptures or tears as a result of the application of pressure.

21. Method of using the aqueous composition according to claim 1, comprising applying the aqueous composition to a substrate.

22. Method of substrate surface pre-treatment, comprising
a) mixing components K1 and K2 of a two-component adhesion promoter according to claim 1
b) applying the resulting mixture to a substrate surface.

23. Method of adhesive bonding or of sealing, comprising
i) mixing components K1 and K2 of a two-component adhesion promoter composition according to claim 1,
ii) applying the resulting mixture to a substrate S1 to be bonded or sealed,
iii) flashing off the resulting mixture,
iv) applying an adhesive or sealant to the flashed-off resulting mixture located on the substrate S1, and
v) contacting the adhesive or sealant with a second substrate S2; or
i') mixing components K1 and K2 of a two-component adhesion promoter composition according to claim 1,
ii') applying the resulting mixture to a substrate S1 to be bonded or sealed,
iii') flashing off the resulting mixture,
iv') applying an adhesive or sealant to a surface of a second substrate S2,
v')contacting the adhesive or sealant with the flashed-off resulting mixture located on the substrate S1;
or
i") mixing components K1 and K2 of a two-component adhesion promoter composition according to claim 1,
ii") applying the resulting mixture to a substrate S1 to be bonded or sealed,
iii") flashing off the resulting mixture,
iv") applying adhesive or sealant between the surfaces of the substrates S1 and S2, wherein the second substrate S2 is formed from the same material as or a different material from the substrate S1.

24. Method according to claim 22, wherein step v) or v') or iv") is followed by curing the adhesive or sealant.

25. Method according to claim 22, wherein the adhesive is a moisture-curing one-component polyurethane adhesive.

26. An aqueous two-component adhesion promoter composition comprising two components, the first component, K1, comprising:

at least one organoalkoxysilane S selected from the group of consisting of aminosilanes, epoxysilanes, mercaptosilanes, and (meth)acrylatosilanes, and at least one anhydrous surfactant T, wherein the weight total of organoalkoxysilane S and surfactant T is more than 90% by weight, based on the weight of component Kl;

the second component, K2, comprising:

water, and at least one acid;

wherein the at least one acid is present in an amount such that after components K1 and K2 have been mixed the resulting mixture has a pH of 3.5 to 4.5, wherein the at least one acid is an organic acid which contains a sulphur atom or a phosphorus atom.

27. An aqueous two-component adhesion promoter composition according to claim 26, wherein the at least one acid is an organic sulphonic acid.

28. An aqueous two-component adhesion promoter composition according to claim 26, wherein the weight fraction of the organoalkoxysilane S is ≧40% by weight, based on the weight of component K1.

29. An aqueous two-component adhesion promoter composition comprising two components, the first component, K1, comprising:

at least one organoalkoxysilane S consisting of a compound of the formula (XIV):

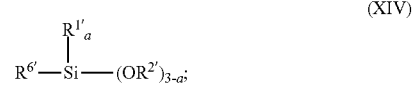

where $R^{1'}$ is an alkyl group having 1 to 8 C atoms;
$R^{2'}$ is an alkyl group having 1 to 5 C atoms;
$R^{6'}$ is a linear or branched alkyl chain having 1 to 20 C atoms which is optionally substituted by an epoxy, or vinyl or (meth)acrylate group;
and a is the value 0, 1 or 2, and
at least one anhydrous surfactant T, wherein the weight total of organoalkoxysilane S and surfactant T is more than 90% by weight, based on the weight of component K1, wherein the weight fraction of the organoalkoxysilane S is z 40% by weight, based on the weight of component K1;

the second component, K2, comprising:

water, and at least one acid;

wherein the at least one acid is present in an amount such that after components K1 and K2 have been mixed the resulting mixture has a pH of 3.5 to 4.5, wherein the at least one acid is an organic acid which contains a sulphur atom or a phosphorus atom.

30. An aqueous two-component adhesion promoter composition according to claim 29, wherein in formula (XIV), a is 1 or 2.

31. An aqueous two-component adhesion promoter composition according to claim 29, wherein the at least one acid is an organic sulphonic acid.

* * * * *